(12) United States Patent
Seeley

(10) Patent No.: US 7,177,018 B2
(45) Date of Patent: Feb. 13, 2007

(54) MULTIPLEX ILLUMINATOR AND DEVICE READER FOR MICROCANTILEVER ARRAY

(75) Inventor: Timothy D. Seeley, Bethesda, MD (US)

(73) Assignee: Protiveris, Inc., Rockville, MD (US)

( * ) Notice: Subject to any disclaimer, the term of this patent is extended or adjusted under 35 U.S.C. 154(b) by 424 days.

(21) Appl. No.: 10/705,434

(22) Filed: Nov. 10, 2003

(65) Prior Publication Data

US 2004/0165244 A1    Aug. 26, 2004

Related U.S. Application Data

(60) Provisional application No. 60/425,149, filed on Nov. 8, 2002, provisional application No. 60/432,052, filed on Dec. 10, 2002.

(51) Int. Cl.
*G01B 11/24* (2006.01)
(52) U.S. Cl. .................... 356/154; 356/614
(58) Field of Classification Search ............... 356/614, 356/138, 154
See application file for complete search history.

(56) References Cited

U.S. PATENT DOCUMENTS

| | | | | |
|---|---|---|---|---|
| 5,298,975 A | * | 3/1994 | Khoury et al. | 356/624 |
| 5,563,710 A | * | 10/1996 | Webb et al. | 356/445 |
| 5,737,084 A | * | 4/1998 | Ishihara | 356/609 |
| 6,050,722 A | | 4/2000 | Thundat et al. | 374/121 |
| 6,096,559 A | | 8/2000 | Thundat et al. | 436/147 |
| 6,118,124 A | | 9/2000 | Thundat et al. | 250/332 |
| 6,121,603 A | | 9/2000 | Hang et al. | 250/216 |
| 6,325,904 B1 | | 12/2001 | Peeters | 204/403 |
| 2002/0092340 A1 | * | 7/2002 | Prater et al. | 73/24.02 |
| 2003/0092016 A1 | | 5/2003 | Wiggins et al. | 435/6 |

FOREIGN PATENT DOCUMENTS

| | | |
|---|---|---|
| GB | 2 289 345 A | 11/1995 |
| WO | WO 01/33226 A1 | 5/2001 |

OTHER PUBLICATIONS

International Search Report for PCT/US03/35715, mailing date: May 4, 2004.
European Search Report for PCT/US03/35715, mailing date: Dec. 28, 2005.

* cited by examiner

*Primary Examiner*—Richard A. Rosenberger
(74) *Attorney, Agent, or Firm*—Sonia K. Guterman; Adam M. Schoen; Lawson & Weitzen, LLP

(57) ABSTRACT

A device reader having a multiplex illuminator, the illuminator, and methods for reading deflection of a large number of microcantilevers are provided. The illuminator includes a micro-optical subassembly for illuminating cantilevers (illuminator) that uses a plurality of VCSELs for generating an array of electromagnetic beams, and focuses the beams on the cantilevers. Deflection of the cantilevers causes a change in angle of the beams reflected from the cantilevers, which is recorded by a plurality of position sensitive devices.

43 Claims, 19 Drawing Sheets

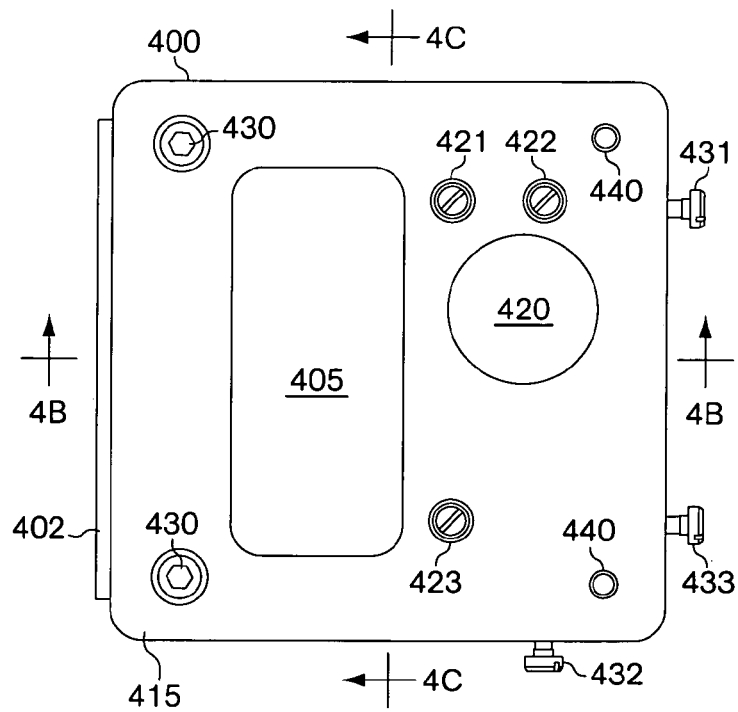
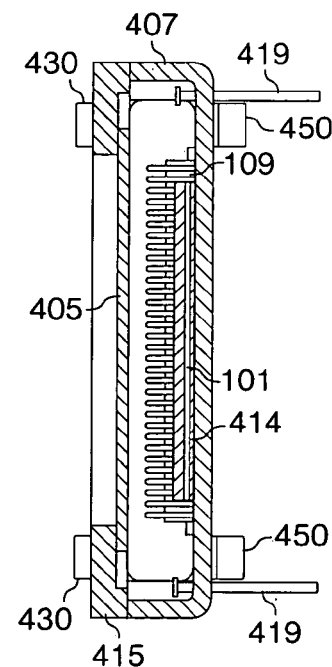
Fig. 4A
Fig. 4C
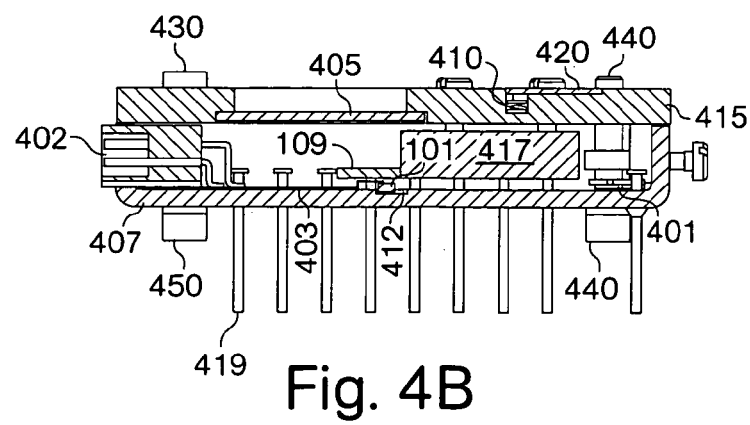
Fig. 4B

MULTIPLEX ILLUMINATOR AND DEVICE READER FOR MICROCANTILEVER ARRAY

RELATED APPLICATIONS

This application claims from the benefit of U.S. provisional application 60/425,149, filed Nov. 8, 2002, and U.S. provisional application 60/432,052, filed Dec. 10, 2002, both of which are hereby incorporated by reference in their entireties herein.

FIELD OF THE INVENTION

Aspects of the present invention are directed to apparatus and methods for reading deflection of microcantilevers, and apparatus and methods for generating, focusing, and detecting a large number of electromagnetic beams.

BACKGROUND

Developments in the fields of fabrication and the use of microcantilevers have recently led to technologies for rapid detection of extremely small amounts of a variety of materials in a large number of samples. Applications for these technologies include the fields of diagnostics and environmental measurements, including measurement of chemicals and pathogens having military significance.

Microcantilevers are described in U.S. Pat. No. 6,050,722, issued Apr. 18, 2000, and U.S. Pat. No. 6,096,559, issued Aug. 1, 2000. Microcantilevers having one surface customized to detect one or more of several types of microforces in the environment, the microforces causing a change in surface tension resulting in deflection of the cantilever, are known in the art (U.S. Pat. No. 6,118,124, issued Sep. 12, 2000, and U.S. Pat. No. 6,325,904, issued Dec. 4, 2001, both of which are incorporated herein in their entireties). Typically, a microcantilever is activated, i.e., deflects, in the presence of a microforce in an environment of the microcantilever, from an original or resting position of the cantilever in the absence of the microforce. A chemical microforce is generated by the presence of a chemical composition in a fluid sample in contact with the cantilever. The composition interacts with and binds to a component of a customized cantilever surface of the array of cantilevers.

For maximally efficient use of microcantilever detector technology, it is desirable to have an apparatus that simultaneously reads the deflections of a large number of microcantilevers. It would be further desirable to integrate such an apparatus into a system to record and analyze the data, to produce a useful output.

SUMMARY OF THE INVENTION

One aspect of an embodiment of the invention is directed to a method for reading an array of detectors contained in a device, the method comprising illuminating each of the detectors of the array in the device using a plurality of electromagnetic beams arranged in an array, such that at least one electromagnetic beam illuminates at least one of the detectors of the array, and sensing a plurality of electromagnetic beams reflected from the detectors. In a related embodiment, illuminating includes transmitting the electromagnetic beams from an array of vertical cavity surface emitting lasers (VCSELs). In general, the detectors can be microcantilevers within the device, each cell of the device having a plurality of microcantilevers.

Sensing deflection of the microcantilevers can include using at least one position sensing detector (PSD), so that the beams reflected from the microcantilevers are converted to an electric current by the PSD, the extent of the current determined by the position of the beam incident to the PSD. In another embodiment, deflection sensing can be accomplished with a charge coupled device (CCD). Further, a microfluidics device can be located at a distance from the array of VCSELs of at least about 3 mm, or at least about 5 mm, for example, the distance can be at least about 20 mm or at least about 30 mm, or about 90 mm.

Illuminating the detectors is accomplished, in a first instance, by generating the electromagnetic beams. A multiplex illuminator is a subassembly within the device reader. The illuminator generates the beams from an array of VCSELs mounted upon a substrate. Further, illuminating the detectors can comprise incorporating at least one beam splitter located between the VCSELs and the detectors. The wavelength of illumination can be from about 670 nm to about 850 nm or from about 1200 nm±20 nm to about 1550 nm±20 nm, for example, the wavelength of illumination is 760±about 20 nm, or the wavelength of illumination is 850 nm±about 20 nm.

An embodiment of the method herein further comprises placing a test liquid in the device for analysis of the liquid. A suitable device is provided as described in U.S. patent application Ser. No. 10/054,760 published May 15, 2003 (publication number U.S. 2003-0092016, which is incorporated herein by reference in its entirety). The test liquid contains a biological or an environmental sample. It can contain a biological composition or molecule which the microcantilevers are configured to bind, for example, a nucleic acid, a protein, a lipid, a drug, a toxin, or all or a portion of a virus or a cell. In the embodiment in which an illuminator is used for reading deflection of microcantilevers located in a microfluidics device, sensing the deflection can be used to detect a binding of a composition, the composition being present in the sample contained in the microfluidics device, the binding is to a molecule on a surface of the microcantilever.

Another embodiment of the invention is directed to a device reader, which is an apparatus for reading an array of microforce detectors contained in a microfluidics device, the apparatus comprising a housing having an opening to receive the microfluidics device; a multiplex illuminator having a plurality of illuminators positioned in the housing such that each illuminator is configured to provide an electromagnetic beam to at least one of the detectors in the array of detectors; and a position sensing device contained in the housing and positioned to receive at least one electromagnetic beam reflected from the detectors. In general, the detectors can be microcantilevers, and the illuminators can be a linear array of a plurality of vertical cavity surface emitting lasers (VCSELs). A microfluidics device can be located at a distance from the VCSELs, for example, the distance can be about 3 mm or about 5 mm, for example, about 20 mm or about 30 mm to about 90 mm, for example, the distance can be about 20 mm, or about 30 mm. The device reader can further comprise a beam splitter for directing beams from the illuminators. The illuminators generate an electromagnetic beam that can have a wavelength of about 760±20 nm, or about 850 nm±20 nm.

The microfluidics device can further comprise at least one interaction cell, and at least one port and one pump for introducing a test liquid sample into the interaction cell, and at least one valve for controlling the movement of liquids within the microfluidics device. The plurality of microcantilevers in the interaction cell can be configured to bind to a component of the test liquid, for example, the microcantilever can be configured to bind to a molecule in a biological sample or in an environmental sample. The biological sample can be a nucleic acid, a protein, a lipid, a drug, a toxin, and all or a portion of a microorganism.

The multiplex illuminator can also have an array of microlenses located between the VCSELs and the microcantilever detectors. The VCSELs can be mounted upon a thermally and electrically conducting substrate on a surface within the subassembly, and the substrate can comprise Kovar, i.e., the inner surface of the housing of the illuminator. The electrically conducting substrate is used to die-bond a common cathode of the VCSEL die. The apparatus can also have a microflex, electrical interconnect circuit, comprising electro-deposited copper on polyimide film such as Kapton® E. Alternative metals are within the scope of the microflex circuit, for example, copper, nickel and gold, and layers comprising these metals. The microflex circuit can comprise a plurality of electrical contacts arranged to facilitate wire-bonding of the contacts to the VCSEL anodes. The VCSEL output apertures can have a diameter of about 1 µm to about 10 µm, for example, the aperture can be about 1.5 µm, about 2 µm, about 3 µm, about 4 µm or about 5 µm. The output apertures can all have the same diameter, for example, a diameter of about 5 µm, or the apertures can be of different sizes, for example, the different sizes can be arranged in a pattern.

The array of electromagnetic beams can comprise at least about 20 beams, for example, at least about 30 beams, or at least 60 beams. The position sensitive devices (PSDs) can comprise at least one photosensitive cell wherein a position of the one or more beams reflected from one or more of the microcantilevers indicates an extent of deflection of the microcantilevers. In one embodiment, beams from the plurality of the microcantilevers in an interaction cell are directed to one PSD, so that the number of operational PSDs in the apparatus corresponds to the number of interaction cells of the microfluidics device. In a particular embodiment, the device has four interaction cells, and the apparatus has four PSDs. In another embodiment, the light reflected from four targets is directed to one PSD.

An embodiment of the invention is a multiplex illuminator which is a micro-optical subassembly for illuminating a plurality of targets, the apparatus comprising: a means for generating and transmitting a plurality of electromagnetic beams in a linear array; an electrical circuit having electronics, control, wiring harness and interface connector; and a microlens array for focusing each beam to provide a spot of illumination on each target. The target is located at a fixed distance from the microlens array so that a beam forms a spot on the target and is reflected from the target. The multiplex illuminator further comprises a housing for the subassembly, which is emplaced within a device reader that holds the target, and additional components for reading the reflection of the beams from the target. In certain embodiments, the electrical circuit having electronics, control, wiring harness and interface connector is a connector for receiving electrical power coupled to the means for generating the power.

In general, the target can be an array of microforce detectors, for example, a plurality of microcantilevers, and the microcantilevers can be located within a removable microfluidics device positioned within the housing. The apparatus can have one or a plurality of position sensitive devices for receiving and processing beams that are reflected from the targets, the targets being located in a plurality of interaction cells in a microfluidics device. The surfaces of the microcantilevers can be configured to contain microforce-enabling materials. The microforce can be a chemical microforce, a magnetic microforce, a thermal microforce, a piezoelectric microforce, or a piezoresistive microforce.

The invention in another embodiment provides a multiplex illuminator for generating an array of electromagnetic beams for reading a plurality of detectors, comprising a plurality of vertical cavity surface emitting lasers (VCSELs), a circuit with electronics and control, and a housing. The detectors are generally microcantilevers. The illuminator can also have a beam splitter. The illuminator generates an array of electromagnetic beams having a wavelength from about 670 nm±20 nm to about 1550 nm±20 nm. Generally the illuminator generates an array of electromagnetic beams having a wavelength of about 850 nm±about 20 nm. In an alternative embodiment, the illuminator generates an array of electromagnetic beams having a wavelength of about 760 nm±about 20 nm. The illuminator can further have an array of microlenses located between the VCSELs and the microforce detectors.

The illuminator is a subassembly of the device reader described herein. In fabricating the illuminator subassembly, the VCSEL array chip can be mounted on a thermally and electrically conducting substrate, for example, the VCSEL array chip can be mounted directly in the Kovar housing. The subassembly has a plurality of VCSEL output apertures, with a diameter selected from the group consisting of about 1.5 µm, about 2.0 µm, about 3.0 µm, about 4.0 µm, and about 5.0 µm. In another embodiment, the VCSEL output apertures can have a diameter of from at least about 1.5 µm to about 5 µm, of from at least about 5 µm to about 10 µm, of from at least about 10 µm to about 15 µm, or of from at least about 15 µm to about 20 µm. The subassembly can be located in a housing, comprising, for example, Kovar®. A windowed lid with micropositioner screw block is attached to the housing. A microlens holder with microlens array is mounted on the micropositioner screw block.

The subassembly is a multiplex illuminator, since it comprises a plurality of VCSELS, for example, it has at least 30 VCSELS, or, for example, at least 60 VCSELS. Each VCSEL is individually addressable, so that the lasers can be switched on or off one at a time or in user-defined groups. The multiplex illuminator can be placed within the device reader, which further houses a microfluidics device having a plurality of interaction cells, within each of which is positioned a microcantilever array. Each beam of the array of beams illuminates a spot of about 20 µm to about 100 µm in diameter focused on each microcantilever. Further, the distance from the VCSEL to the microcantilever is about 30 mm.

BRIEF DESCRIPTION OF THE DRAWINGS

FIG. 4A is a top view of an embodiment of the illuminator, and FIG. 4B and FIG. 4C are cross-sectional views taken in the planes as illustrated by the dashed lines in FIG. 4A.

DETAILED DESCRIPTION OF EMBODIMENTS

Figure 1:
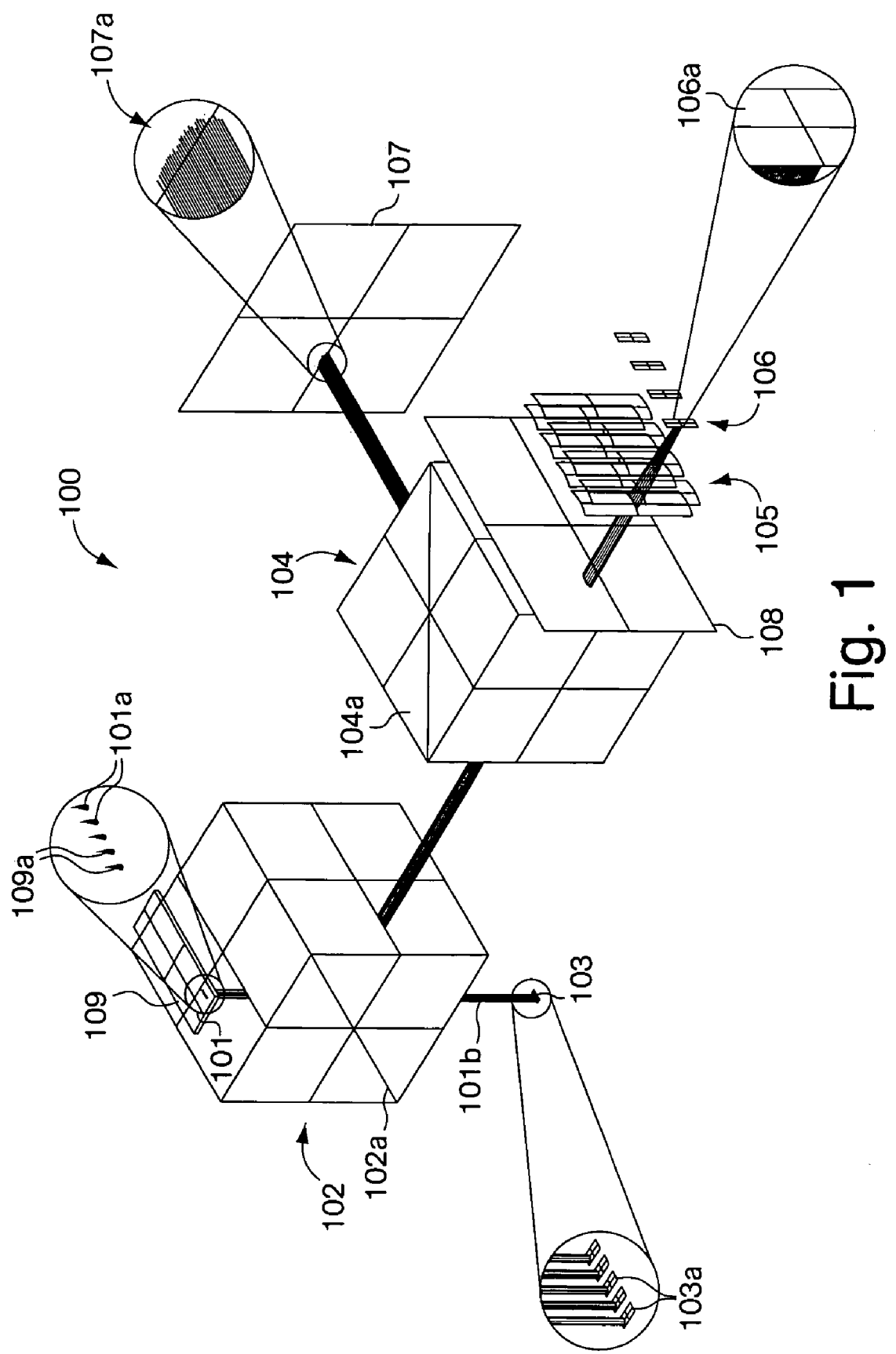
FIG. 1 is a functional block diagram of a device reader in accordance with an embodiment of the present invention.

Physical principles involved in various embodiments of the invention will be described with reference to FIG. 1, which is a functional block diagram of a device reader 100 in accordance with one embodiment of the invention. The device reader includes an array 101 of vertical cavity surface emitting lasers 101a (VCSELs), that emit electromagnetic beams 101b, each beam passing through a microlens 109, a primary beam splitter 102, the beams illuminating an array 103 of microcantilevers 103a, which reflect to a secondary optional beam splitter 104, an assembly of cylindrical lenses 105, a linear position sensitive device (PSD) array 106 having light (photo-) detectors 106a, and a TV camera 107 (represented as an image plane in FIG. 1) that detects an image 107a. As shown in FIG. 1, the light can also pass through an interference filter 108, which may be mounted on a housing. Although not shown in FIG. 1, the microcantilevers would typically be contained in a microfluidics device as described herein.

The array 101 of VCSELs generates a plurality of electromagnetic beams in a linear array. In one embodiment, the wavelength of the beam is about 760 nm±about 20 nm. Other wavelengths are envisioned for use in other embodiments. For example, other possible wavelengths are, without limitation, about 670 nm±20 nm to about 850 nm±20 nm, or even to about 1550 nm±20 nm. In one embodiment, the array of beams has a pitch of about 250 µm, corresponding to the sum of the width of a microcantilever plus the spacing between a pair of adjacent microcantilevers. The diameter of the spot of light on each microcantilever is, in one embodiment, about 100 µm (full width of the beam intensity profile at half-maximal value; FWHM) using a VCSEL aperture of diameter of about 4 to about 5 µm at a distance of about 29 mm between the VCSELS and the microcantilever target.

The electromagnetic beams 101b from the VCSELS pass through the microlens array 109 (each beam passing through one microlens 109a) and primary beam splitter 102, before illuminating the microcantilevers. The beams reflect from the microcantilevers back toward the primary beam splitter, 102. The exact paths of the reflected beams are dependent on whether there is any deflection of the microcantilevers. The beams then reflect from a partially reflective inner surface 102a of the primary beam splitter 102 and pass to the secondary beam splitter 104. In the secondary beam splitter, a portion of each beam is reflected from a partially reflective surface 104a toward the camera 107, while a portion of each beam passes through the surface 104a toward the PSD array 106. The portion of the beams that passes through the secondary beam splitter also passes through the interference filter 108 and the cylindrical lens array 105 prior to striking the PSD array 106. The cylindrical lens array assembly 105 focuses the beams onto the PSD array. The secondary beam splitter and the camera are optional devices that allow an operator to visually confirm that the position of the laser spots are at the desired location on the microcantilever in conjunction with automatic detection that occurs using the PSD array.

Each photo-detector of the PSD array 106 generates a photocurrent that is delivered to two electrodes of the photo-detector in response to the position and intensity of the incident light on the photo-detector. The measured magnitudes of the two photocurrents and the known geometry of the photo-detector are required to calculate the centroid of the light spot on the photo-detector. Changes in microcantilever deflection can be determined by detecting and measuring changes in the light spot position on the photo-detector. An extent of deflection of the microforce "detector", which in certain embodiments herein is a microcantilever that has been fabricated to have a microforce detecting surface, is read by the PSD, which is a light detector, and is converted to a current. In some embodiments, the magnitude of current is measured and stored as information in a database in a computer.

In one embodiment, the microlens array 109 comprises microlenses, each lens having a distance between proximal and distal surfaces of about 0.5 mm. The dimensions of an exemplary array are 5 mm by 18 mm by 0.5 mm. Appropriate microlens arrays are commercially available, and can be obtained from a fabricator such as MEMS Optical (205 Import Circle, Huntsville, Ala., 35806), for example, fabrication being from a material such as Corning 7980 fused silica. Additional embodiments having refinements of a microlens array, such as an array fabricated with a material having a graded index of refraction, can be obtained from NSG America (28 World's Fair Drive, Somerset, N.J. 08873).

Figure 14:
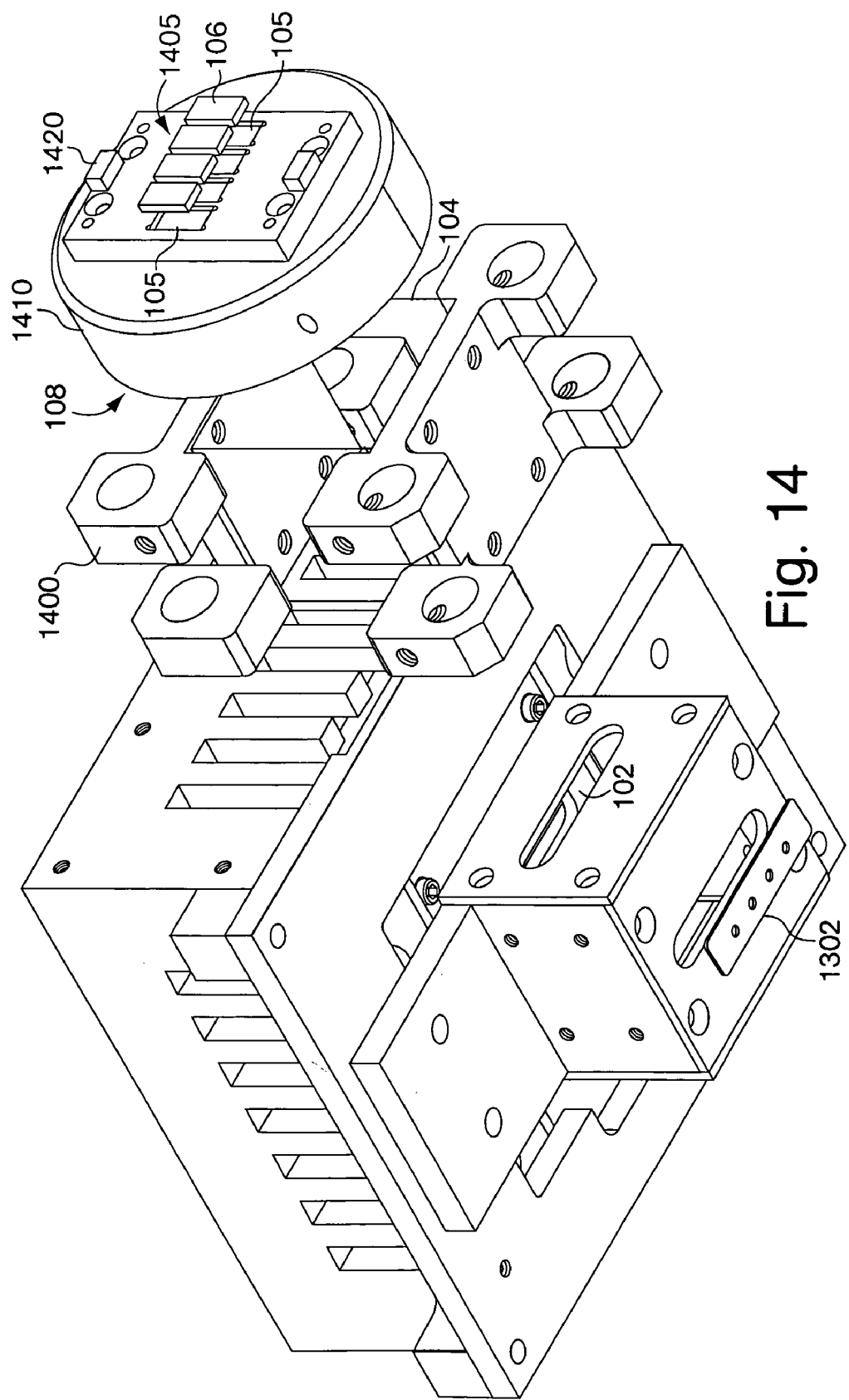
FIG. 14 is an illustration showing attachment of the illuminator to a secondary beam splitter and mount, a cylindrical lens array, and a position sensing device (PSD) array.

A particular embodiment of the device reader 100 that operates using the general principles described herein will now be described with reference to FIGS. 2A and 2B that show isometric views of the device reader 100, and with reference to FIG. 3 which shows an isometric view of the device reader 100 with several minor components and outer housing removed, so that the major components can be seen in greater detail. The device reader 100 includes a power module 205, an illuminator assembly stage 209 that includes an illuminator device 400, a PC104 compliant electronics assembly 202 which is an electronic standard for embedded computer systems, a CCD camera assembly 203, a microfluidics system manifold 204 an ACDC power supply module (to power the thermoelectric cooler) 207, A PSD assembly is present however is not visible in this FIG., and is shown in FIG. 14, and diagramatically at 106 in FIG. 1. The components of the device reader are mounted in a housing having a bottom plate 206 and a frame 201 for positioning of side walls and doors, a top, an access panel, and other housing components and various washers and screws known to one of skill in the art.

An unknown sample to be tested for having a microforce generating composition is placed in an interaction cell of a microfluidics device having an array of microcantilevers customized to respond to the composition. The microfluidics device is transferred into the microfluidics system manifold 204. A user of the device communicates electrically over a serial interface (such as RS232, RS485 and/or Ethernet) with the apparatus using a host computer. The power supply modules 205 and 207 deliver DC power to the electronics assembly 202 which regulates and distributes power to the illuminator subassembly 400. Then an array of electromagnetic beams as in FIG. 1 is generated and focused in the illuminator, to illuminate the target microcantilevers in the microfluidics device, which reflects the beams to the PSD assembly shown diagrammatically in FIG. 1 and in more detail with respect to other components in FIG. 14, generating photocurrents which are related to the angle of deflection of the cantilever.

The illuminator subassembly 400 can be seen suspended at a known fixed distance above the fluidics manifold supported on a jack for vertical positioning to gain access to the fluidics manifold when emplacing the fluidics device. The photo-sensitive PSDs 106 on the PSD assembly are arrayed interiorly adjacent to the illuminator and microfluidics manifold. According to this arrangement, beams generated by the illuminator subassembly pass out of the subassembly housing, in a downward direction according to the orientation of the apparatus in FIGS. 2 and 3, and are reflected to the PSD stage, upward and to the right.

Figure 2:
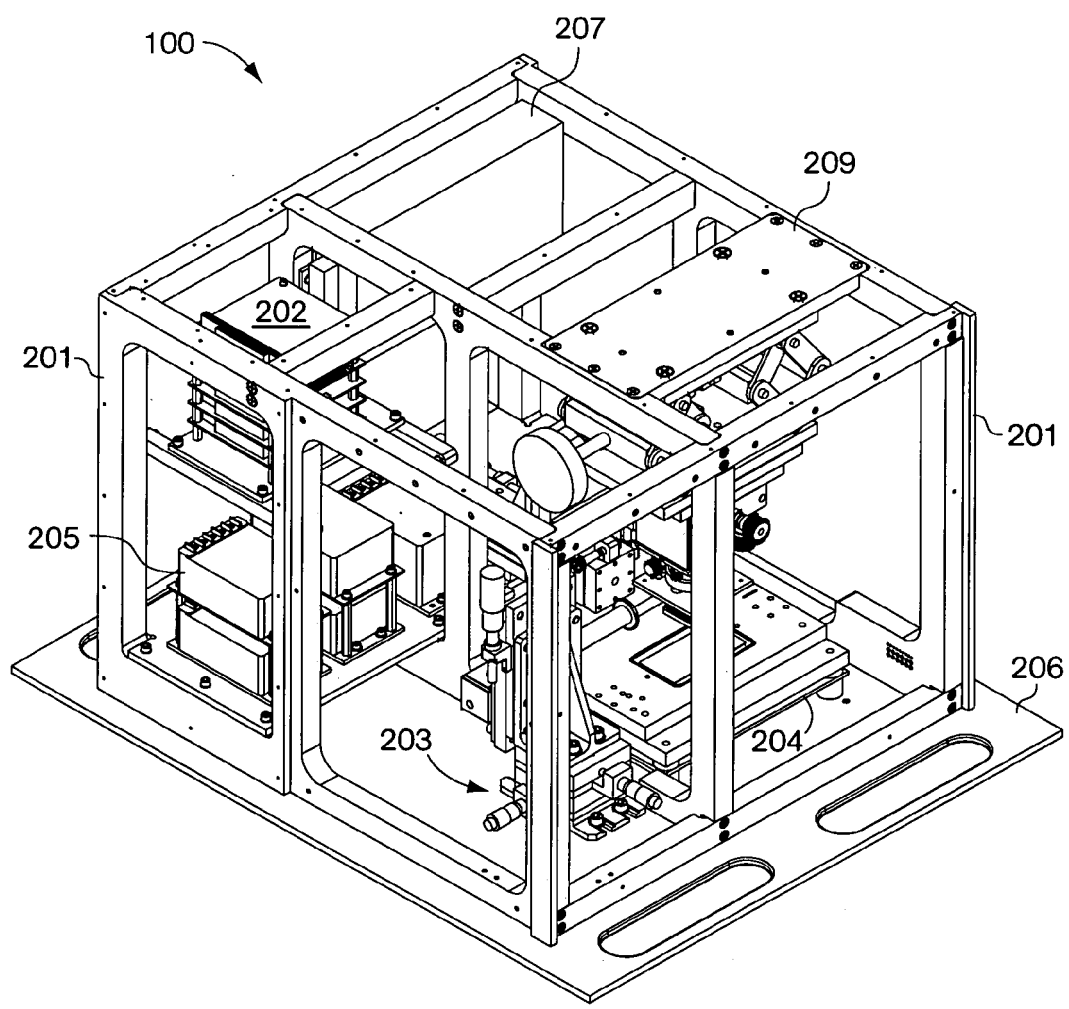
FIG. 2 shows a first isometric view of an embodiment of the device reader.

In one embodiment, the entire apparatus is sized to fit conveniently on a laboratory surface or on a work bench, for example, with the apparatus being about 21 inches on its longest side. In FIGS. 2 and 3, the device reader is shown with its top lid and sidewalls removed. In one embodiment, the top lid and side walls are attached to the frame 201 with hinges to provide access to the components prior to and between operations.

Photocurrents generated by the PSD as a function of the position of the incident beam can be further processed by attachment into an analog processor which uses electronics to convert the photocurrents into digital signals for conveyance to a host computer. The microcantilevers in the interaction cells of a microfluidics system, for example in U.S. patent application Ser. No. 10/054,760, are charged (processed with a series of reactants in solutions according to design of the surfaces of the microcantilevers, then loaded with at least one sample and/or controls and additional samples into a plurality of interaction cells) using various fluids and paths; other fluids and paths are used for opening and closing valves. The microfluidics system can be loaded into the device reader, at the microfluidics system manifold, 204, as shown in FIG. 2 and FIG. 3. The microfluidics device has a plurality of interaction cells, each cell containing an array of microcantilevers, such that all of the microcantilevers in one interaction cell are identically charged and identically exposed to a sample (or to a control). Electromagnetic beams from an embodiment of the illuminator 400 illuminate the microcantilevers in a cell, and the reflected beams from the plurality of microcantilevers in the cell are combined and focused (or are focused individually, by sequencing the VCSELs) in this embodiment onto a single PSD of the PSD array 106, for statistically significant data acquisition.

With reference to FIGS. 4–10, structures, fabrication, operation and use of an illuminator device 400 in accordance with a general embodiment will now be described, and additional embodiments are described herein. FIG. 4 shows a top view and two cross-sectional views of components of illuminator device 400, each cross-sectional view being taken along an axis of symmetry that is parallel to the edges of the housing or bottom of the illuminator. In a general embodiment, the housing or bottom portion of the illuminator 407 is made of Kovar, an iron alloy, and components of the illuminator device 400 of FIG. 4 are fabricated and placed within the housing. Kovar is useful in applications having semiconductor devices having a large surface area bonded to a metal substrate because the coefficient of thermal expansion (CTE) of Kovar is reasonably well matched to that of the semiconductor material. Thus a stress induced in the semiconductor material during thermal excursions is less likely to damage the device.

FIG. 4A is a top view of the complete illuminator 400, and FIG. 4B and FIG. 4C are cross-sectional views along the horizontal and vertical dashed lines in FIG. 4A, respectively. The top view FIG. 4A shows that the bottom housing 407 is fitted with a combination windowed lid and micropositioner screw block 415, for adjusting the micropositioner or microlens mount 417 attached to the microlens array 109. FIG. 4B is a cross-section view taken through the temperature sensitive diode 401 as shown in FIG. 6A and through the SMT connector 402 as seen in FIG. 7A. FIG. 4C is a cross-section view taken through through the length of the VCSEL array 101 and the microlens array 109. The top structures shown in FIG. 4A are the combination micropositioner/environmental lid 415 and window 405, which are visible also in FIGS. 4B and 4C. Also shown on the top of the lid in FIG. 4A is the circular stainless steel dust cover 420 for an internal spring, 410, which connects the micropositioner screw block 415 to the microlens mount 417. A temperature sensor 401 can be seen in FIG. 4B. The window 405 through which the VCSEL beams 101b can pass after focussing with the microlens array 109, can be seen both in FIGS. 4A and 4B.

Figure 8:
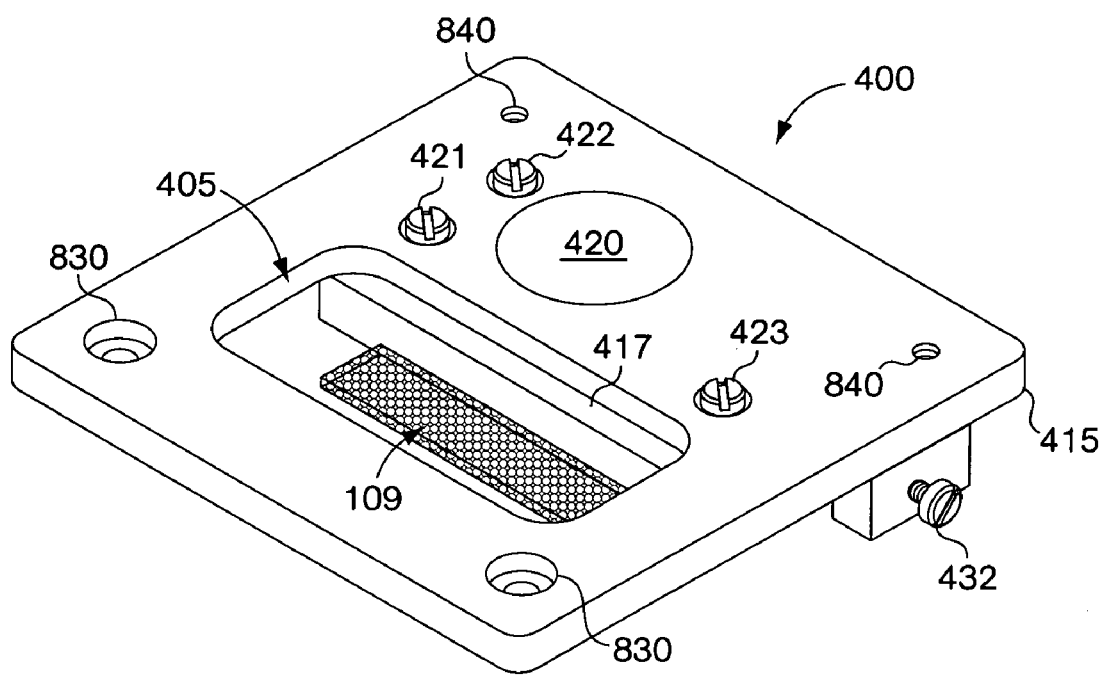
FIG. 8 is an illustration showing a top view of the illuminator lid, which is also an aluminum micropositioner screwblock with a microlens holder with microlens array mounted beneath, which is emplaced as a lid on the illuminator.

Also shown in FIG. 4A are two screws 430 mounted from the top in the lid 400, and threaded into the SMT connector 402 mounting holes described in more detail in FIG. 8, which are provided for that purpose, and two screws 440 mounted from the bottom through clearance holes of the Kovar package 407 and threaded into tapped holes in a micropositioner screw block 415.

In a different embodiment not shown herein, a ceramic substrate above the Kovar floor supports two spacers, which in the cross section as in FIG. 4B would be to the right of the VCSEL array 101. The microlens array 109 generally found in embodiments of the illuminator, and one or more spacers if present for support of the microlens array, would be located to the side of the VCSEL array 101, on the floor of the Kovar housing, or on a ceramic substrate as is present in the embodiment not shown herein, supporting the microlens array above the VCSEL array.

In the embodiment shown in FIGS. 4A–4C herein, the microlens array is held in position by the combined environmental lid/micropositioner screw block 415 which adjusts the microlens mount 417 for the microlens array 109, as shown in FIG. 4B. A flex circuit 403 in electrical contact both with the SMT connector 402 and the VCSEL array, 101, is mounted directly inside and on the bottom of the Kovar package, 407. The microlens array 109 is mounted above the VCSEL array; adjustment of the position of the microlens array uses three miniature screws 421, 422 and 423 shown on top of the lid, 415 in FIG. 4A, and three screws on the sides of the lid 431, 432, and 433. Adjustment of these screws permits the travel, in six axes (x, y, and z and roll, pitch and yaw), of the aluminum microlens mount 417 with the attached microlens array 109. The microlens mount 417 that holds the microlens array 109 can be removably affixed to the illuminator, or alternatively is an integral part of the illuminator. As used herein, "roll" means rotation about the y-axis, "pitch" means rotation about the x-axis, and "yaw" means rotation about the z-axis.

In FIG. 4C, sides of the Kovar housing 407 can be seen on the top and bottom of the cross section, and the bottom of the housing is to the right, representing the floor of the illuminator.

Immediately above the floor, to the left as in FIG. 4C, is the silver-loaded epoxy bonding 414 to the right of the VCSEL array 101 in the die recess, then the microlenses 109. Precise emplacement of the VCSEL array is obtained by butting the array against the walls of the die nest or recess 412, and the VCSEL array is held in place by the layer of silver loaded epoxy, 414 mixed with precision glass spacer beads (not shown in the cross section). Also shown in FIGS. 4B and 4C is a ground pin 419.

Further, in an embodiment not shown in figures herein, the ceramic substrate is to the left of the bottom portion of the Kovar housing, followed by a thin layer of metalization, the VCSEL array, spacer, and microlens array.

Figure 5:
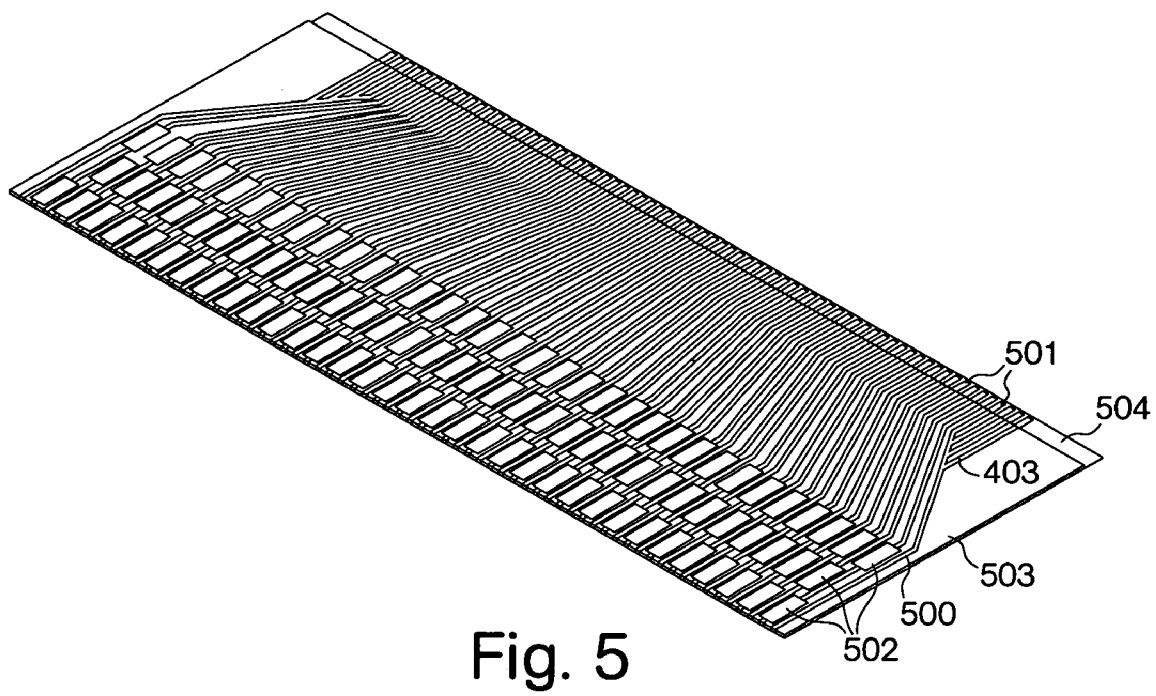
FIG. 5 is a 3D solid model of a microflex interconnect circuit for the illuminator, having surface mount technology (SMT) connector pads and test pads.

With reference to FIG. 5, the microflex interconnect circuit 403 which is to be attached to the illuminator subassembly 400 (also known as the illuminator chip) is shown. The circuit provides a separate electrical lead for each operational VCSEL anode in the linear array of VCSELs. The VCSEL array chip 101 is made of gallium arsenide (GaAs) or aluminum gallium arsenide (AlGaAs). The VCSELs are oxide-confined, however proton-implanted VCSELs are within the scope of the device. The single mode VCSELs produce a Gaussian profile for each spot of illumination on each of the plurality of microcantilevers, 103a, as shown in FIG. 1.

The flex circuit 403 is made from electrodeposited copper and metal coatings 500 on a polyimide film substrate 503, for example, Kapton® E (DuPont). The metal coating include SMT connector pads 502, and VCSEL connector pads 501. In one embodiment, the coating layers and approximate thicknesses of each are: Kapton® E (polyimide) 25 µm substrate, with metal layers of copper 18 µm, nickel 0.25 µm to 0.75 µm, and gold 1 µm min to 1.5 µm max. An exemplary interconnect has, for example, a 250 µm inner lead pitch, a 317.5 µm outer lead pitch, and a 100 µm line width with 65 µm spacing. Fabrication including custom etching of the electrodeposited copper is commercially available, and can be obtained from, for example, Micro-Connex, 34935 SE Douglas St., Snoqualmie, Wash.

In the embodiment of the illuminator shown in the FIGS. herein, the flex circuit is mounted directly on the floor of the Kovar package 407, in contact on the left as shown in FIG. 4B with the SMT connector 402 and on the right with the VCSEL array 101. In an alternative embodiment, the SMT connector contacting the VCSEL array chip or die is emplaced on a ceramic substrate. In the embodiment shown in FIG. 5, 72 leads are shown, with inner leads contacting the VCSELs 101, at the right side of the figure. An exemplary number of VCSEL elements in an array herein is greater than 20 or greater than 30, for example, 64 elements, however any suitable number greater than about 20 is within the scope of the invention.

Different numbers of leads corresponding to different number of VCSEL elements are within the scope of the invention. At the left side, the rectangular landing points and test points of each lead can be seen. Each interconnect in the array of interconnect circuits 403 shown in FIG. 5 leads from an array of SMT connector pads 502 to one VCSEL in the VCSEL array 101. The outermost two rows of pads, shown to the left in FIG. 5B, are connector pads, and the innermost third row to the right in FIG. 5B are test pads. The interconnect 403 supplies a source of electrical power to all or a selected portion of the VCSELs by contact with the VCSEL connector pads 501 as shown in FIG. 5. The extent of the selected portion is controlled by the user of the illuminator subassembly 400 and device reader 100, for generating the desired number and location of illuminator elements comprising the array of electromagnetic beams.

With reference to FIG. 5, the SMT connector pads 502, each of which is a stack up of metallic layers on a substrate 503 is followed by an adhesive layer of 12.7 µm thickness, and topped with a Kapton® E (DuPont) cover film, of thickness 12.7 µm. These pads function in the circuit of supplying electrical power from an external source, to each of the VCSELs in the array, conducted to the VCSEL using the microflex interconnect circuit metal coatings 500 of FIG. 5. The pads in the rows at the left and middle are used to solder leads to the SMT connector 402, while the inner rows of pads can be used as test points.

Figure 6:
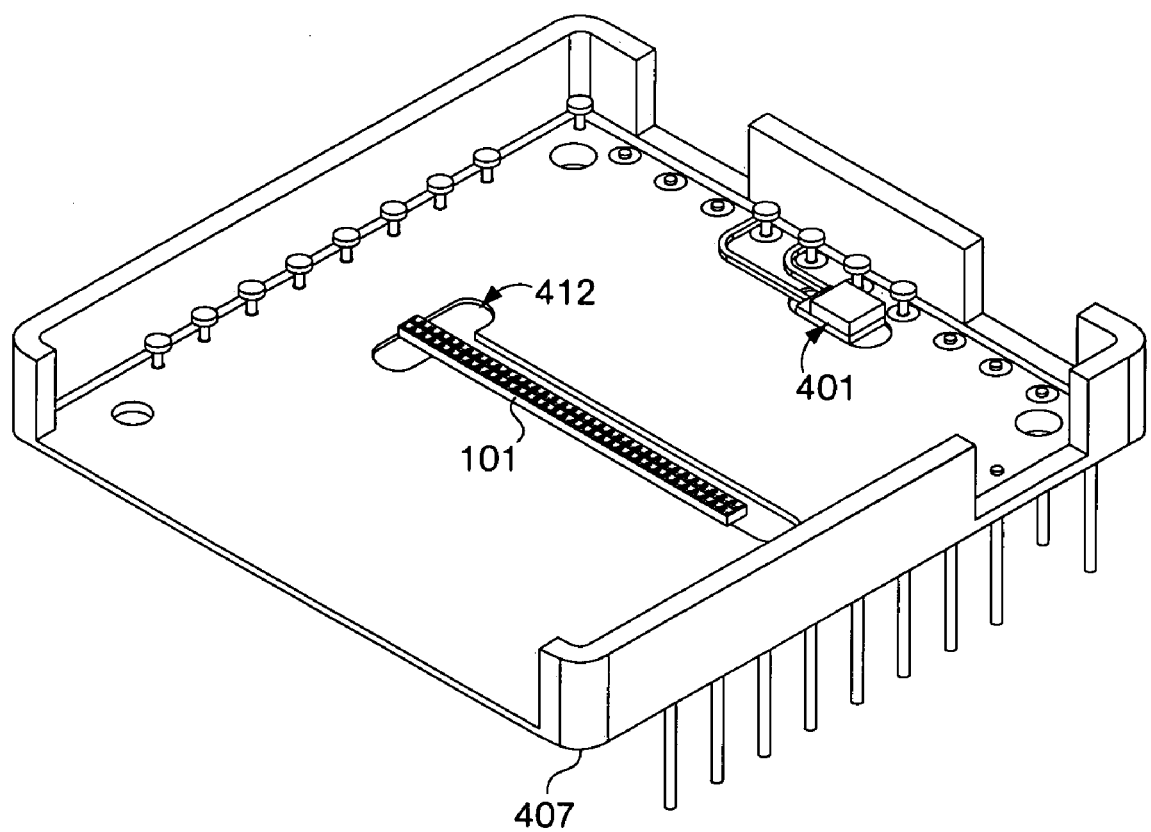
FIG. 6 is an illustration showing a 2×72 element VCSEL array in a die recess (nest) and a temperature sensor attachment in the base of a Kovar housing package of the illuminator.
Figure 7:
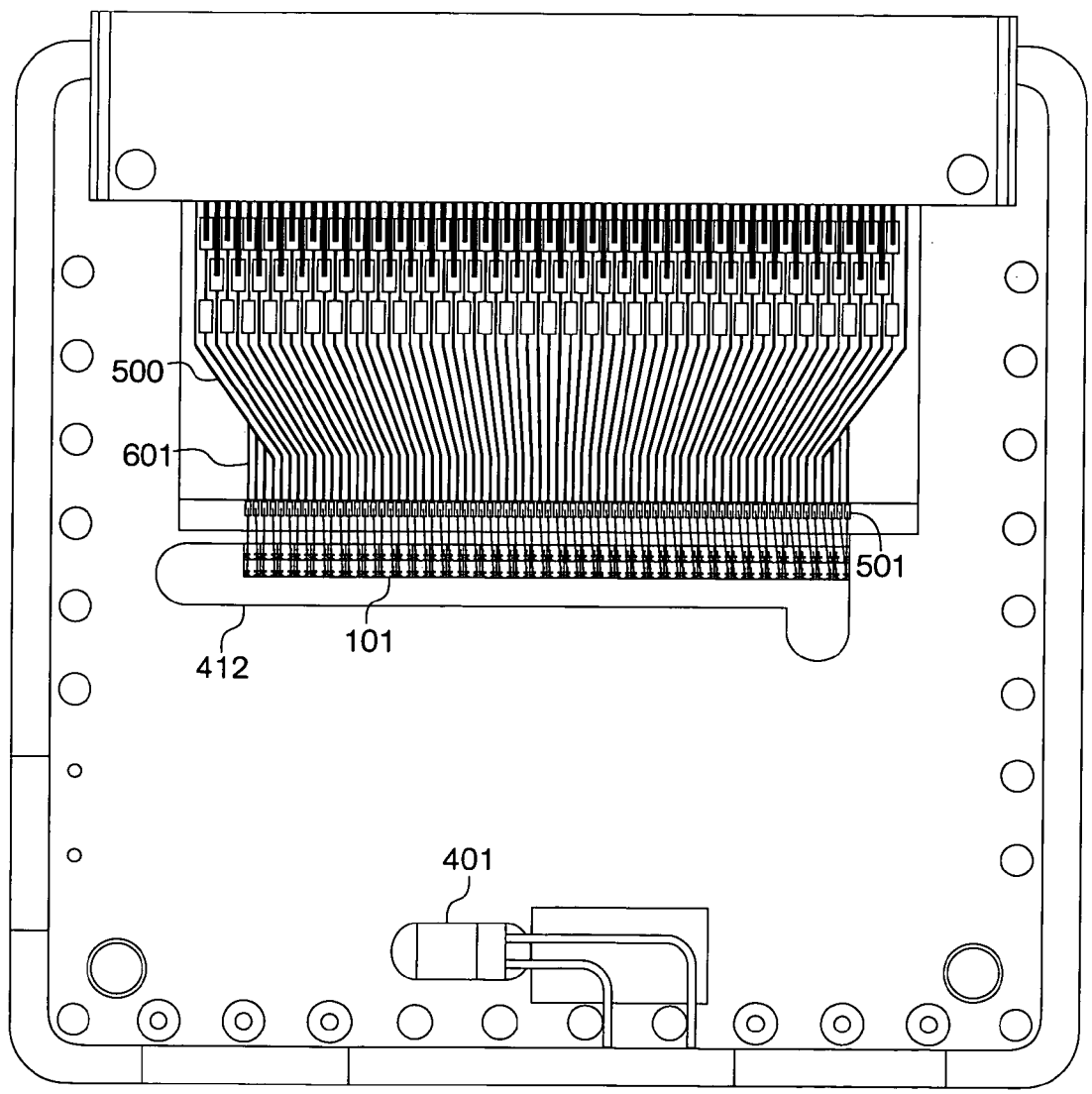
FIG. 7 is an illustration showing the Kovar housing with wire bond from the flex circuit to the VCSEL array in the recess.

With reference to FIG. 6, greater detail is shown of the arrangement in the Kovar package 407 of the VCSEL array die 101 to the die recess 412. The die recess or nest, 412 is cut into the Kovar housing floor for precise emplacement of the VCSEL array, 101. The shape of the die recess 412 with the VCSEL array 101 held in place by the epoxy layer 414 is shown in FIG. 6. Single wire bonds, 601, provide current, each connecting with a single VCSEL element, and are shown in FIG. 7.

In the embodiment herein, the VCSEL die is mounted in the housing with silver-loaded epoxy (for instance, EPOTEK H20E (Epoxy Technology, 14 Fortune Drive, Billerica, Mass.). After the VCSEL die has been aligned and bonded to the housing, a Johanson block (jo-block) is placed on the VCSEL die to ensure a uniformly thick bond line governed by the diameter of the precision glass beads embedded in the epoxy mixture. This assembly with the jo-block is placed in an oven to cure the epoxy.

Alternative embodiments of electrical connections not shown here, such as use of gold stud bumps on the VCSEL elements, are within the scope of the illuminator herein. The gold stud bumps can be fabricated on the VCSEL array chip using short lengths of gold wire bonded to the VCSEL anodes, and are "coined" or shaped to the desired diameter and height.

In an alternative embodiment not depicted here, a long narrow window is cut into the flex circuit, to permit an unobstructed passage of the VCSEL beams. In a different embodiment not shown herein, an array of individual flex circuit apertures can be implemented instead of one elongated aperture, in which case the aperture array has a pitch (aperture to aperture distance) of 250 µm, corresponding to the center-to-center distance of the VCSEL apertures, and an aperture diameter sufficient to permit the unobstructed passage of each VCSEL beam. In embodiments not shown herein, a flex circuit aperture is formed as a single long, narrow window cut into the Kapton polyimide substrate and cover layers.

The SMT connector 402 is bonded to the flex circuit, either during the same step as bonding the flex circuit 403 to VCSEL anodes, or by an additional step. The SMT connector can be mounted to the flex circuit during the epoxy cure or at a later time. After the cure, the flex circuit with mounted connector is aligned and bonded to the Kovar housing using a low stress epoxy (for example EPOTEK 301-2FL), which is also cured. Then the assembly is placed on a heated stage in a wire-bonding apparatus which is operated to achieve bonds between the VCSEL anodes and the inner lead bond pads of the flex circuit as is well known for those of skill in the art of integrated circuit fabrication. The SMT connector is commercially available, and can be obtained for example from Airborn, Inc., 4321 Airborn Drive, Addison, Tex. An exemplary SMT connector can have two rows, a horizontal surface mount, 65 contacts, and a 1A contact rating.

In another embodiment not shown herein, the flex circuit and a ceramic heat spreader top surface with gold metalization is pre-tinned as required in the region of the ground wire attachment, a commercially available service which is provided for example by Protouch Electronics Assembly (Sterling, Va.). The assembly of the flex circuit, SMT connector and VCSEL array chip onto the Kovar package in the embodiment shown herein, or onto a BeO substrate, are services which can be performed commercially, for example, from Multichip Assembly, Inc., San Jose, Calif.

The VCSEL die 101, temperature sensor 401, SMT connector 402 and flex circuit 403 are mounted in the Kovar package 407. The VCSELs can be functionally tested, as sources of electromagnetic beams, at the point that the electrical connections are complete FIG. 7 shows the Kovar housing package 407 with placement of the SMT connector, flex circuit, and VCSEL array. The Kovar package can be obtained from Olin Aegis, 50 Welby Road, New Bedford Mass. An exemplary Kovar bathtub plug-in PB125125EC157 can be obtained, and modified to accept the SMT connector. Fabrication of a custom Kovar package can be obtained from Olin Aegis.

The temperature sensor 401, for example, a CY7 (OMEGA Engineering, Inc., One Omega Drive, Stamford, Conn.) or DT471 (Lake Shore Cryotronics, Inc., 575 McCorkle Blvd, Westerville, Ohio) temperature sensitive diode, is mounted at the top edge of the floor of the housing using, for example, TRA-BOND 2151 thermal epoxy (TRA-CON, Inc., 45 Wiggins Avenue, Bedford, Mass.).

Figure 9:
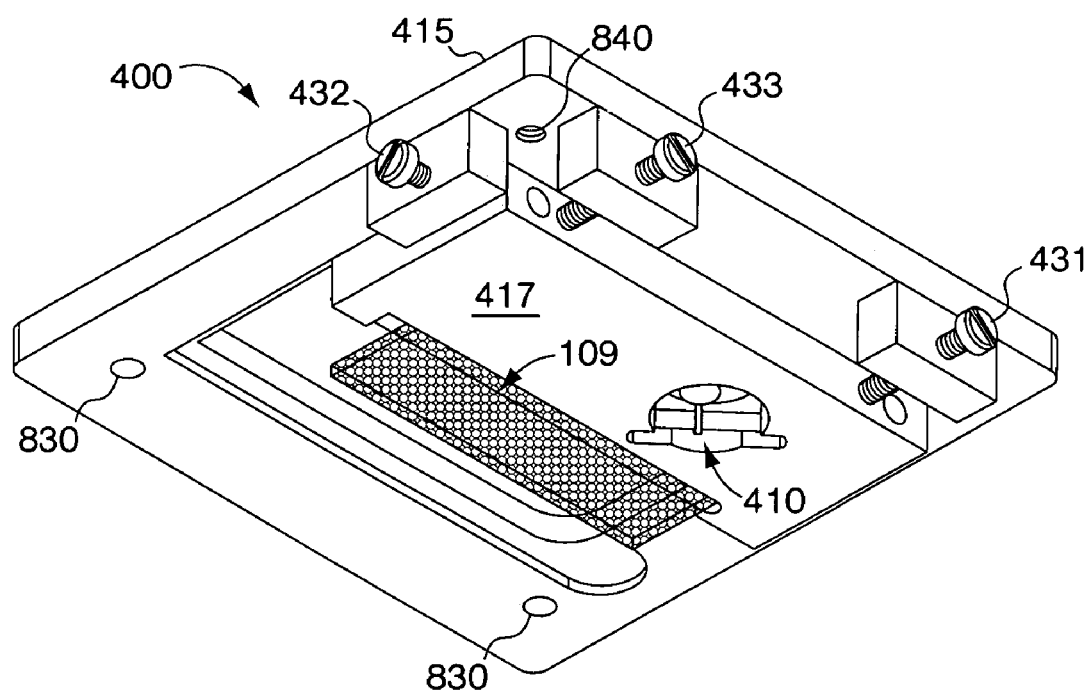
FIG. 9 is a drawing of the underside of the lid, with microlens array held by the microlens mount, and showing a micropositioner spring and adjuster screws.
Figure 10:
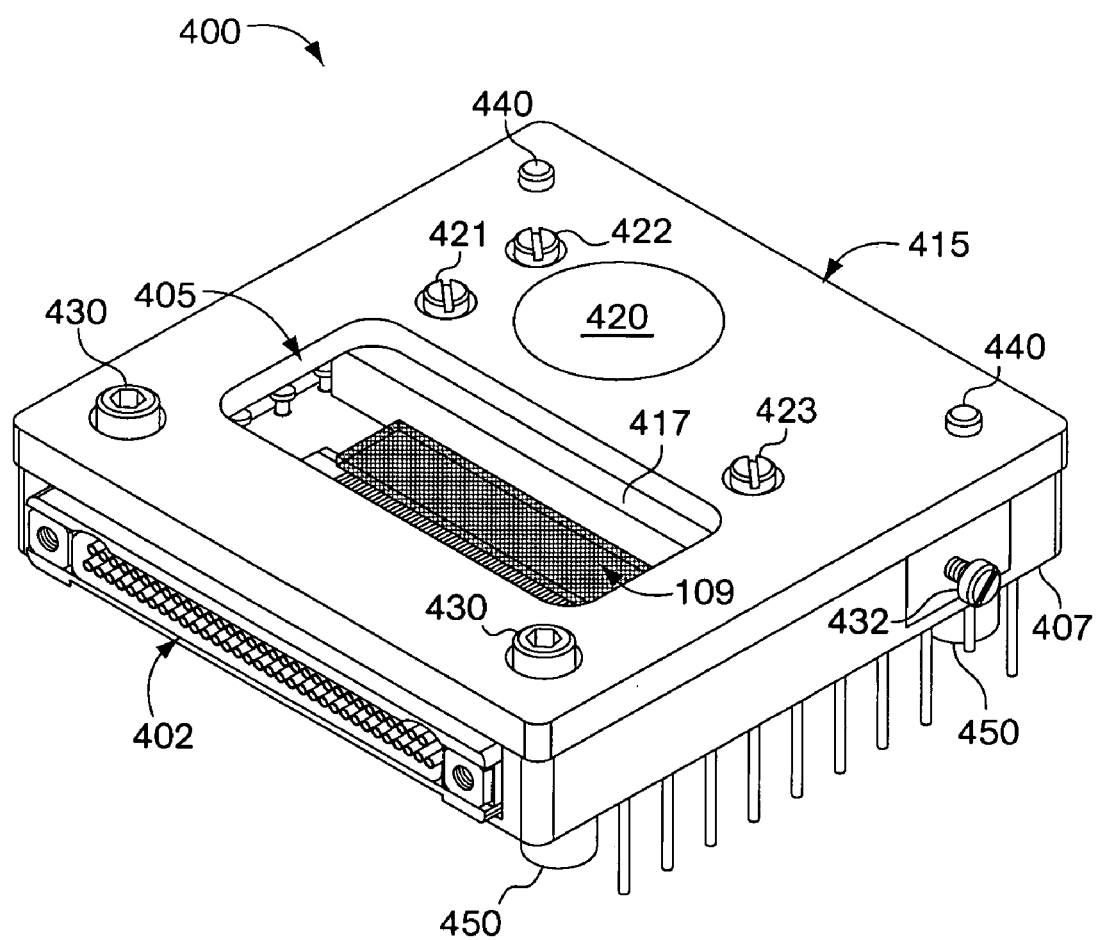
FIG. 10 is an illustration showing the lid mounted on the Kovar housing of the illuminator, with a transparent window atop the microlens array through which the array of VCSEL beams pass.

FIGS. 8–10 show details on fabrication and function of the illuminator lid 415 and components attached to the lid. FIG. 8 shows emplacement of an aluminum microlens mount positioning stage 417 under the lid, attached to the lid/micropositioner screw block 415 for further optical alignment. The microlens array 109, comprising a plurality of bi-convex microlenses, serves to focus each beam from a VCSEL aperture, to obtain a discrete spot of illumination of an appropriate size onto the target microcantilever. The appropriate size of each discrete spot of illumination is about the same width as each microcantilever, or is smaller than the width of each microcantilever. The microlens mount 417 that holds the microlens array 109 in FIG. 8 and the screw block 415 comprise two machined aluminum pieces as shown in FIG. 4B, one of which 415 is an integral part of the lid in the embodiment as shown herein. The lid is also a screwblock that holds the six adjusting screws. The microlens array 109 is mounted to the microlens mount 417 with NOA 81 adhesive (Norland Optical Adhesive, Cranbury, N.J.) and UV curing.

A set of six miniature screws controls the position of the microlenses. Three screws 421, 422 and 423, are on the top of the micropositioner screw block 415, one screw 432, is on the right or front side of the Kovar housing as shown in FIG. 4A, and two screws 431 and 433, are on the back of the Kovar housing, for positioning and adjustment of the microlens array in x, y, and z and roll, pitch, and yaw dimensions. The three screws 421, 422 and 423 on the top of the positioner provide adjustment in the roll, pitch and z-axes. The two adjustment screws 431 and 433 mounted on the back face of the Kovar package provide adjustment in the yaw and y-axes. The adjustment screw 432 mounted on the front face of the Kovar package provides adjustment in the x-axis. FIG. 8 also shows the mounting holes 830 and 840 for the two screws 430 mounted from the top in the lid 415, and two mounting holes for two of the the four screws 440 and 450 mounted from the bottom, respectively. A total of six screws are used in the embodiment herein of the illluminator to hold the top 415 and the bottom 407 together; two bottom mounted screws 440 extend through the top and two bottom mounted screws 450 extend into the SMT connector as do two top mounted screws 430.

In an alternative embodiment not shown in the drawings herein, rather than use of the micropositioner, two glass spacers are emplaced adjacent to the VCSEL array, to be used for positioning the microlens array. In yet other embodiments, one spacer, or more than two spacers are used. The spacers can be borosilicate glass, for example, AF45 borosilicate glass, and is commercially available from Präzisions Glas&Optik Gmbh, Hegestück 11, D-58640, Iserlohn, Germany. An exemplary spacer has dimensions of 5 mm by 14 mm by 0.5 mm. During emplacement, the spacers are mechanically aligned, and fixed in place with, for example, EPOTEK 301-2FL optical epoxy (Epoxy Technology, 14 Fortune Drive, Billerica, Mass.) which is cured at room temperature over a period of 72 hours. The spacer or spacers serve as a support for emplacement of a microlens array. Emplacement of the microlens array upon the glass spacer or spacers is obtained by further active optical alignment (which can be achieved by activating a VCSEL and measuring its beam profile and other relevant characteristics with a laser beam scanning instrument). The array is emplaced and secured in place by use of EPOTEK 301-2FL and room temperature cure. Spacers are not used in the embodiment shown herein.

FIG. 9 shows a bottom and back view of the lid/micropositioner screw block assembly 415 in which the above components can be seen. Also seen here is the spring 410 that connects the lid/micropositioner 415 to the microlens mount 417.

FIG. 10 shows the assembled illuminator 400. The lid/micropositioner 415 functions by use of the six screws 421–423 and 431–433 (of which among the latter group only 432 is visible among the latter screws) in conjunction with the microlens mount 417 holding the microlens array 109. The completed lid is emplaced onto the top of the Kovar housing 407 and is installed with the six screws 430, 440 and 450. A transparent window is installed onto the rectangular opening 405 of the attached lid, with NOA 81 adhesive (Norland Optical Adhesive, Norland Products, Cranbury, N.J.) and UV curing. Installation of the window completes assembly of the multiplex illuminator subassembly. The lid is fabricated from aluminum and the window is made from AF45 borosilicate glass. The beams pass from the microlens array 109 through the window, through a primary beam splitter and then to the target, from which the beam is reflected back to the diagonal of the primary beam splitter and from there to the position sensitive device (linear PSD) 106 as shown in FIG. 1, and as an assembled PDS arrays 1405 in FIG. 14.

Figure 3:
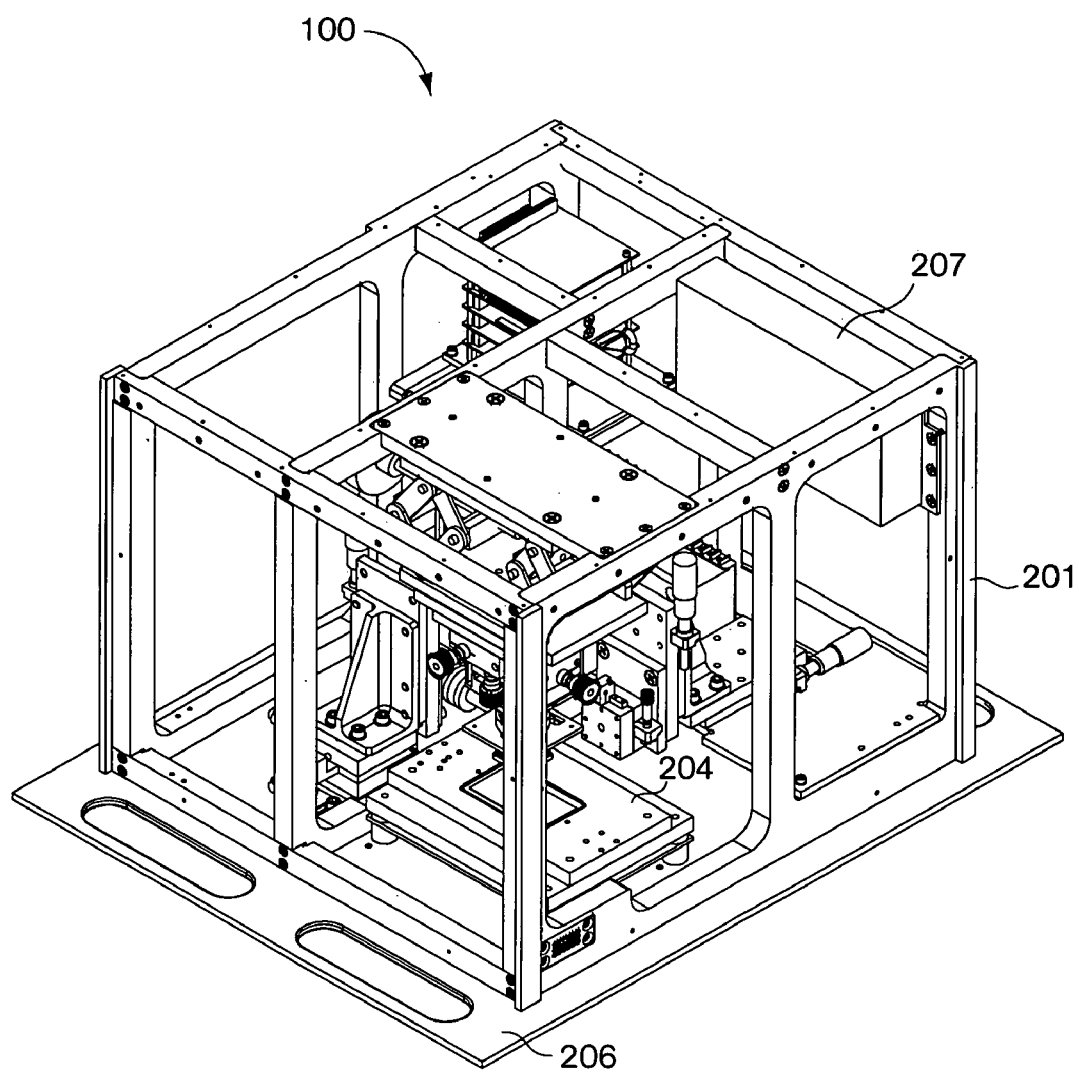
FIG. 3 shows a second isometric view of the embodiment of the device reader.

The complete illuminator subassembly 400 contains the components for providing focused beams of electromagnetic illumination to the targets; it can be removably installed into the device reader apparatus 100 shown in FIGS. 2 and 3, at the location of the illuminator stage, 209.

FIGS. 11–18 show emplacement and function of the illuminator 400 of the present invention in the context of additional components, fabrication and function of the device reader 100 of the present invention.

Figure 11:
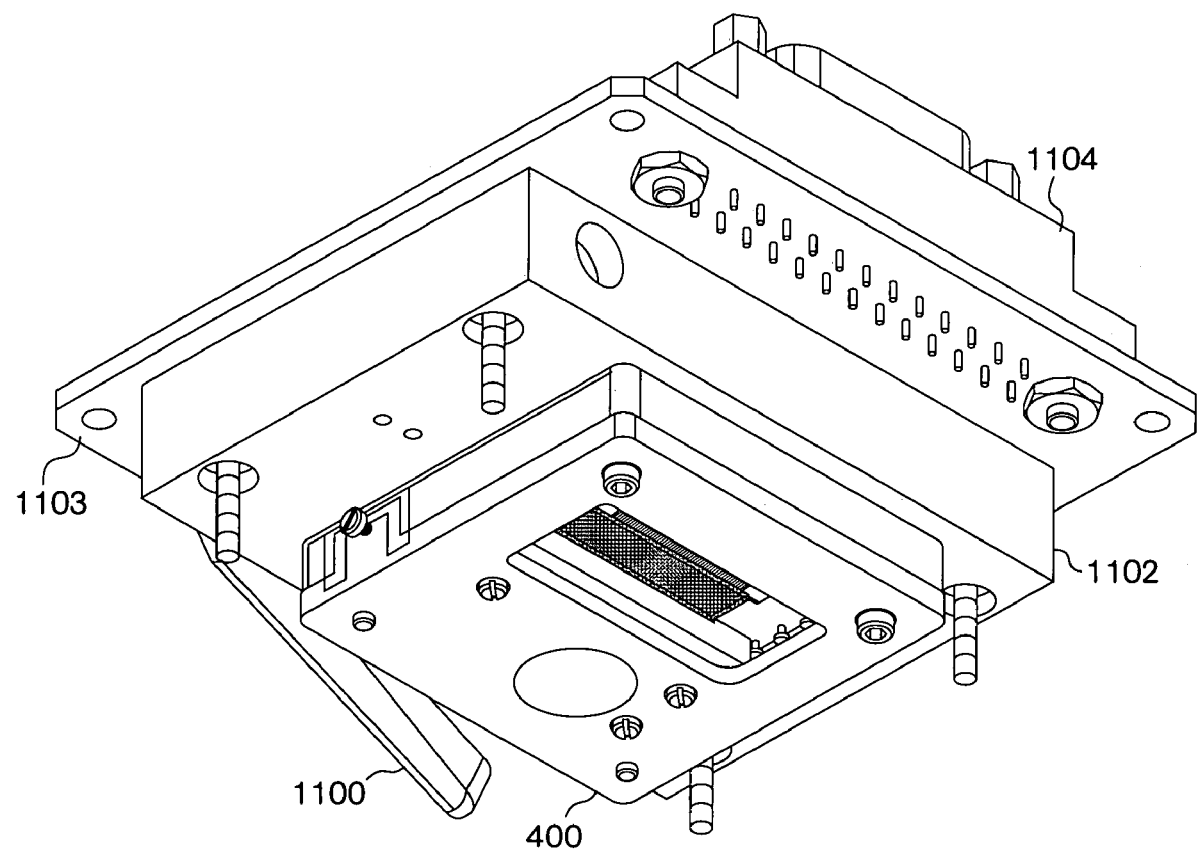
FIG. 11 is an illustration showing attachment of the illuminator to a ZIF socket with a clamping mechanism, and a printed wiring board with a ground return connector.

Accordingly, FIG. 11 shows a clamp 1100 for removable insertion of the illuminator 400 into a ZIF socket 1102, such that when open the clamp releases the pins of the Kovar bathtub plug-in. In one embodiment, the ZIF socket is a 3M Textool PGA kit, having a 13 by 13 matrix, and 3M contacts, available from Elmech, Inc., 8700 Waukegan Rd., Suite 127, Morton Grove, Ill. In this embodiment, the ZIF socket 1102 printed wiring board (PWB) 1103 is a two-layer board, with one oz./sq. ft. copper on epoxy glass (FR-4), fabricated by, for example, Sierra Circuits, Inc., 1108 West Evelyn Ave., Sunnyvale, Calif. Electrical leads are transferred from the ZIF socket to the PWB.

The illuminator-ZIF socket assembly is attached to a micro-D ground return connector 1104 as shown in FIG. 11, for example, an ITT Cannon obtained from PEI Genesis, 2180 Hornig Road, Philadelphia, Pa. Bus wires in the ground return connector provide a return path for current from the VCSEL array.

Figure 12:
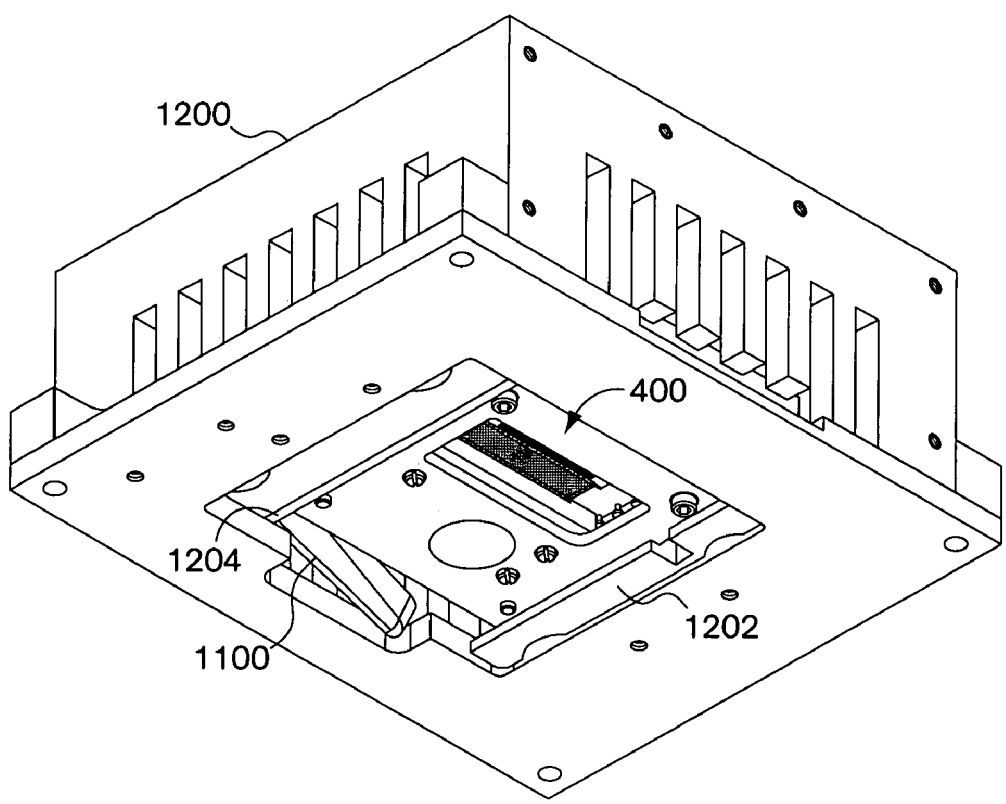
FIG. 12 is an illustration showing attachment of the illuminator to a thermoelectric cooler (TEC), a heat sink, and a heat sink top plate.

The illuminator assembly is further provided with a thermoelectric cooler (TEC) and heat sink 1200 as shown in FIG. 12. The TEC is commercially available from Melcor, 1040 Spruce St., Trenton, N.J. Not visible in FIG. 14 are a Melcor TEC and a Melcor adhesive interface pad, which are also commercially available. The heat sink is provided with a top plate, 1202 shown in FIG. 12, that has a window 1204 to enable transmission of electromagnetic beams from the illuminator, and to enable removal and replacement of the illuminator as a component of the device reader.

Figure 13:
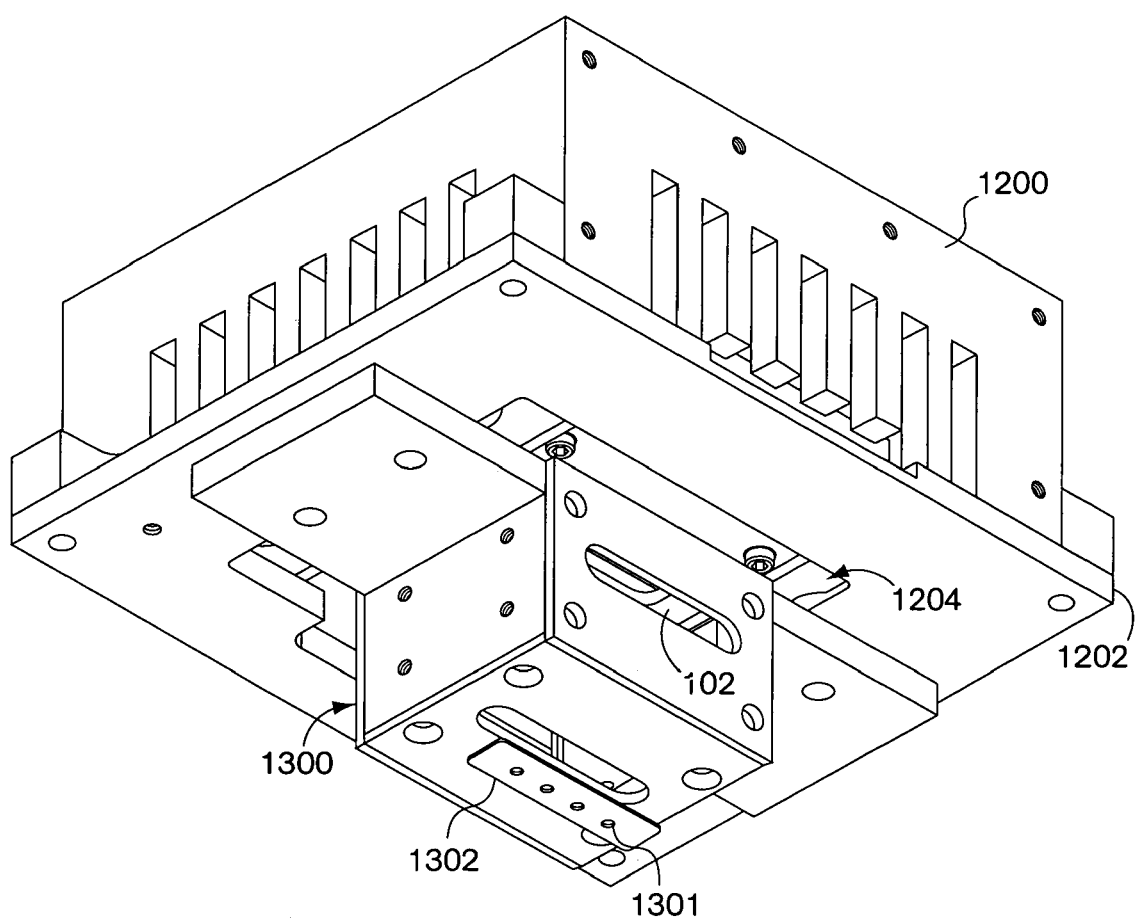
FIG. 13 is an illustration showing attachment of the illuminator to a primary beam splitter and mount, and attachment of a removable microcantilever chip to the device reader.

FIG. 13 shows addition of a primary beam splitter 102 and primary beam splitter mount 1300, to the assembly of TEC cooler and heat sink 1200 with top plate 1204. The beam splitter is, e.g., a non-polarizing dielectric cube beam splitter with dimensions of 20 mm (length, width and depth), and a HEBBAR antireflection coating, and is commercially available from, for example, Melles Griot, 16542 Millikan Ave., Irvine, Calif.

FIG. 13 further shows placement of a removable microcantilever microfluidics device or microcantilever chip 1302 at a location beneath the primary beam splitter. An exemplary microcantilever chip has a plurality of interaction cells 1301, for example, four interaction cells, each containing a plurality of microcantilevers which are the target sensors to be illuminated and the deflection of which is to be read by the device reader. For example, each cell can have 4, 5, 8, 12 or 16 microcantilevers. The distance between the primary beam splitter 102 and the microcantilever chip 1302 shown in FIG. 13 is 5.5 mm. Electromagnetic beams are directed from the VCSEL array of the illuminator through the primary beam splitter, from which a portion of the beams are directed to the surface of the microcantilever targets located in the interaction cells of the chip. The microcantilevers have a surface capable of reflecting the electromagnetic beams.

A secondary beam splitter 104 and a secondary beam splitter mount 1400 to secure its position are shown in FIG. 14. The secondary beam splitter can have the same dimensions and optical properties as the primary beam splitter. An interference filter 108 with interference filter mount 1410, cylindrical lenses 105 and cylindrical lens mount 1420 are also shown. The interference filter mount is an aluminum piece with a machined cylindrical cavity designed to accept a 24 mm diameter by 3 mm thick filter, which is held in place with four nylon-tipped set screws. The rear face of the filter mount has four threaded holes used for mounting the cylindrical lens array.

The filter can be an individual near-infrared interference filter with a transmission wavelength of 760 nm, 25 mm diameter, and a thickness of 6.9 mm, and can be obtained for example from Melles Griot, Irvine, Calif. An array of four cylindrical lenses 105 can be installed, for example, precision plano-cylindrical fused-silica lenses with multi-layer dielectric anti-reflection coating, 750–1100 nm wavelength transmission, 12.5 mm length, 3.2 mm width, 1.8 mm thickness, and 2 mm radius of curvature, also available from Melles Griot. The interference filter passes a narrow portion of the spectrum centered on the operational savelength of the application, for example, 760 nm. The bandwidth can be, for example, 40 nm. The interference filter does not allow light outside this bandwidth, such as ambient light, to pass through to the detectors (PSDs), and rejects off-axis light at the application wavelength such as unwanted reflections present in the system.

An array 1405 of four position sensing devices (PSDs; 106) is installed distal to the cylindrical lenses, as illustrated in FIG. 14. The PSDs can in certain embodiments be single axis, and are available from Elcos AG, Luitpoldstrasse 6, D-85276 Pfaffenhofen, Germany. The PSD array 1405 is soldered onto a PSD printed wiring board with SMT connector (1500; PWB) shown in FIG. 15. The PSD PWB can have one layer and comprises one oz./sq. ft. copper on epoxy glass (FR-4), which is commercially available from Sierra Circuits, Sunnyvale, Calif. Electromagnetic beams reflected from the microcantilever target enter the secondary beam splitter, from which a portion of the beams continues through the cylindrical lens to the PSD array. The PSD 106 converts the incident electromagnetic beam into an electrical signal as a function of the location and strength of the incident beam, via an SMT connector. The SMT connector is, in one embodiment, a two row horizontal surface mount with 25 contacts, and is commercially available (Nanonics Corp., Phoenix, Ariz.). Extension rods 1502 shown in FIG. 22 are used to secure a filter mount cage plate 1504 and a PSD PWB cage plate 1506. The extension rods can be 3 inches in length and 6 mm in diameter. The PSD PWB cage plate 1506 has a 35 mm aperture, as does the filter mount cage plate 1504. Rods and cage plates can be obtained commercially (Thorlabs, Inc., 435 Route 206, Newton, N.J.).

Figure 15:
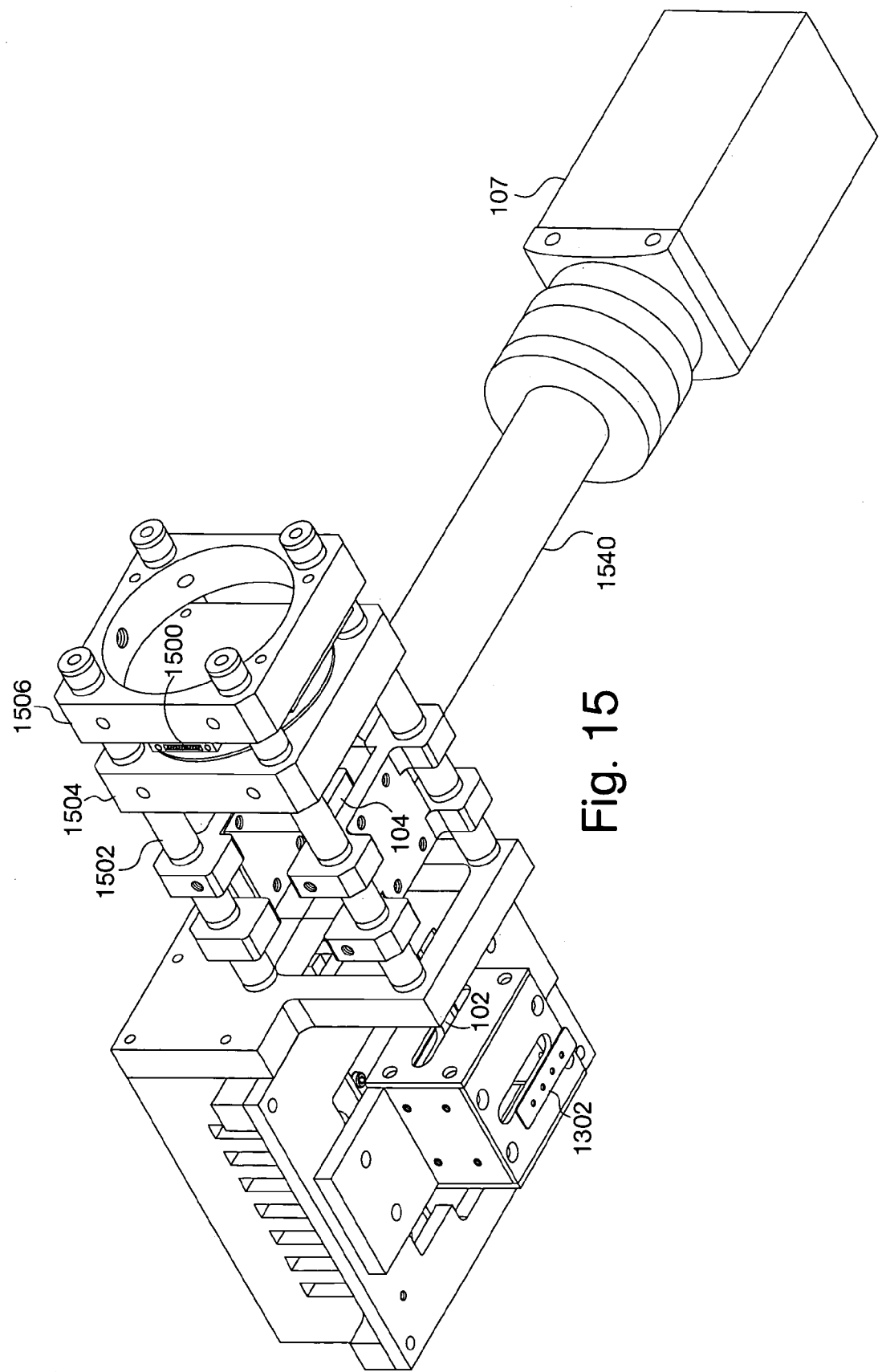
FIG. 15 is an illustration showing attachment of the illuminator to a PSD array printed wiring board (PWB) and SMT connector, a set of extension rods for mounting of the PSD PWB cage plate, filter, filter mount cage plate, extension rod mounting plate, a CCD camera, and a video microscope lens.

A portion of the electromagnetic beams from the secondary beam splitter 104 are directed into a video microscope lens 1540 attached to the CCD camera 107, as shown in FIG. 15. The CCD camera is used as an aide to positioning of the various optics components with respect to each other and to the target microcantilevers. The CCD camera is for example an L55–695 Hitachi Monochrome model KP-M22 (Edmund Industrial Optics, 101 East Gloucester Pike, Barrington, N.J.). The video microscope lens can be a 94 mm/1.5× InfiniStix Video Lens and DL C-Mount 2× InfiniStix Doubler tube, both commercially available (Bunton Instrument Co., Inc., 9607 Doctor Perry Rd., Ijamsville, Md.).

Figure 16:
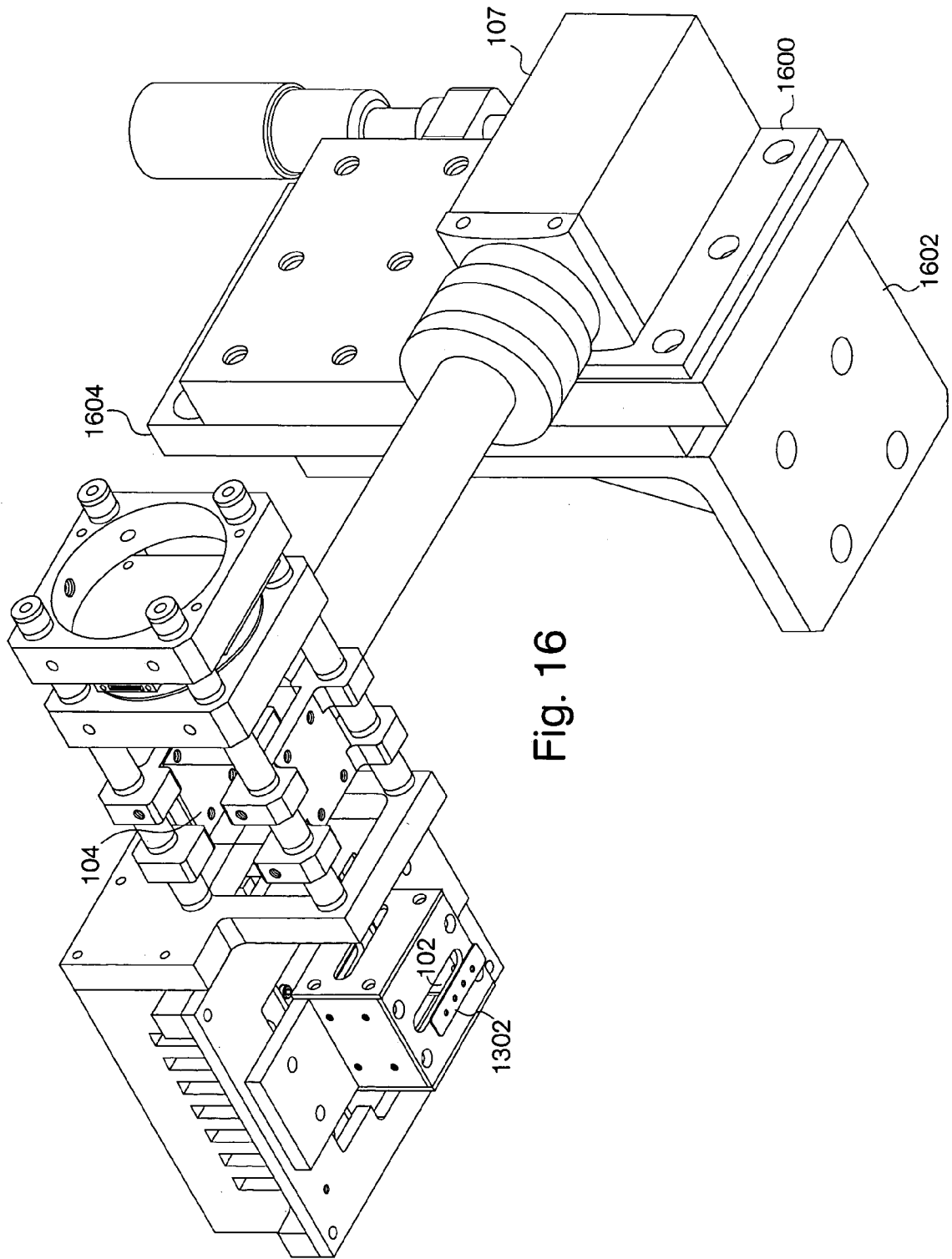
FIG. 16 is an illustration showing attachment of the illuminator to a CCD camera adapter plate, a CCD Camera Z-travel translation stage, and a Z-stage adapter bracket.

The CCD camera 107 is provided with an adapter plate, 1600, and a Z-travel translation stage 1604 as shown in FIG. 16, for example, a 65 mm steel stage with long travel and side drive (available from OptoSigma Corp., 2001 Deere Ave., Santa Ana, Calif.). The CCD camera is also provided with a Z-stage adapter bracket 1602 as shown in FIG. 16. The camera 107 is further fitted with X- and Y-travel stages, 1702 and 1704, respectively, for example, ½0 inch translation stage with micrometers and an MT series base plate, as shown in FIG. 17, both commercially available (Thorlabs, inc., Newton, N.J.).

Figure 17:
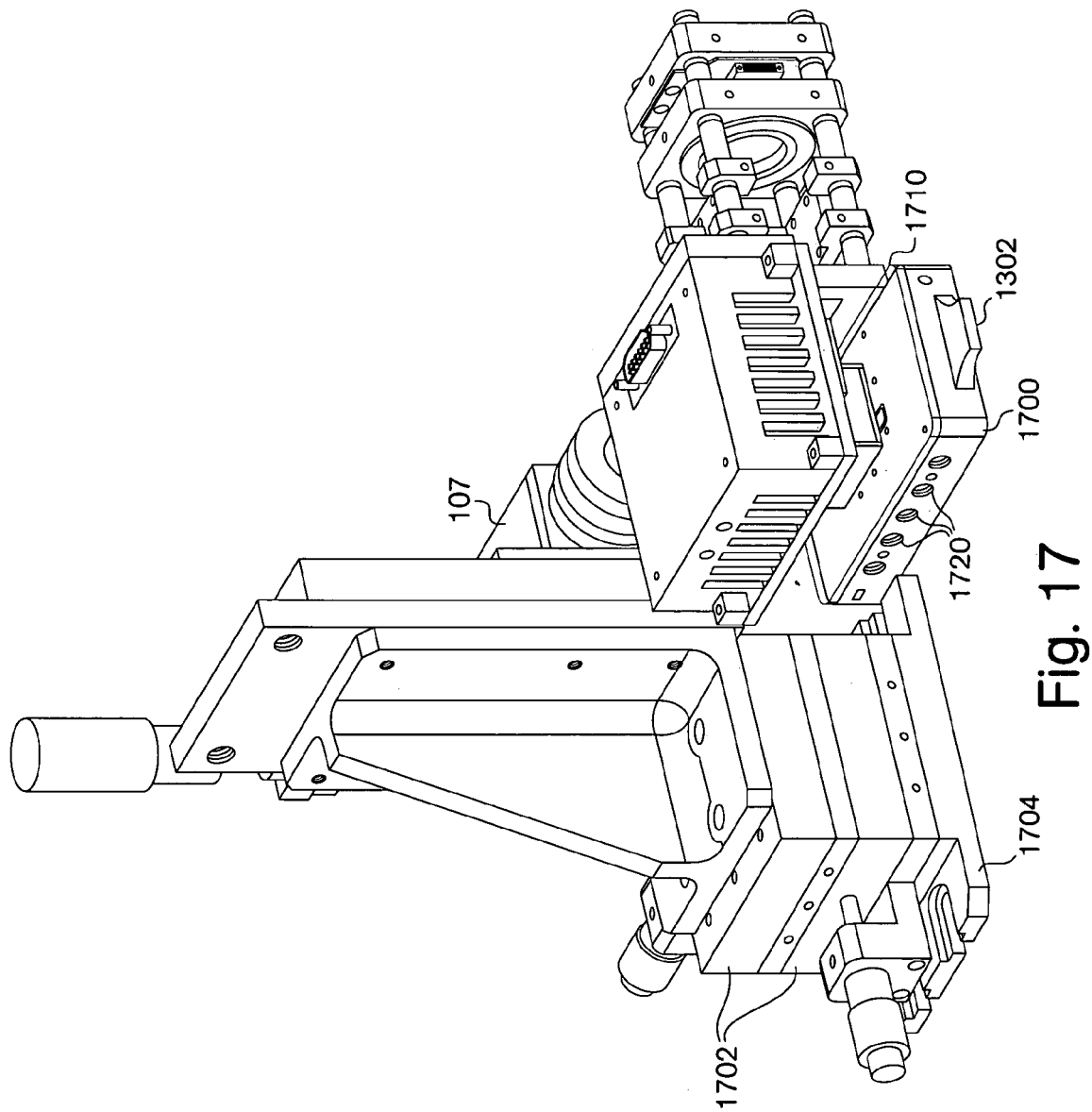
FIG. 17 is an illustration showing attachment of the illuminator to a set of CCD camera XY-travel translation stages, a fluid cell block for a microcantilever chip, and a fluid cell cover.

The microcantilever chip 1302 can further be inserted into a fluid cell block 1700, as shown in FIG. 17. The cell block can be a moldable machinable polymer which is solvent resistant, such as PEEK™ (polyetheretherketone, obtained for example from Entegris, Chaska, Minn.). The microfluidics chip 1302 is inserted into a pocket of the fluid cell block 1700, which is provided with a cell cover 1710 comprising clear acrylic. The cell block has ports 1720 for entry and exit of solutions, and the fluid cell cover includes sealable fluid-proof fittings for the interaction cells, with gaskets or O-rings, to prevent loss of fluid volume during operation.

Figure 18:
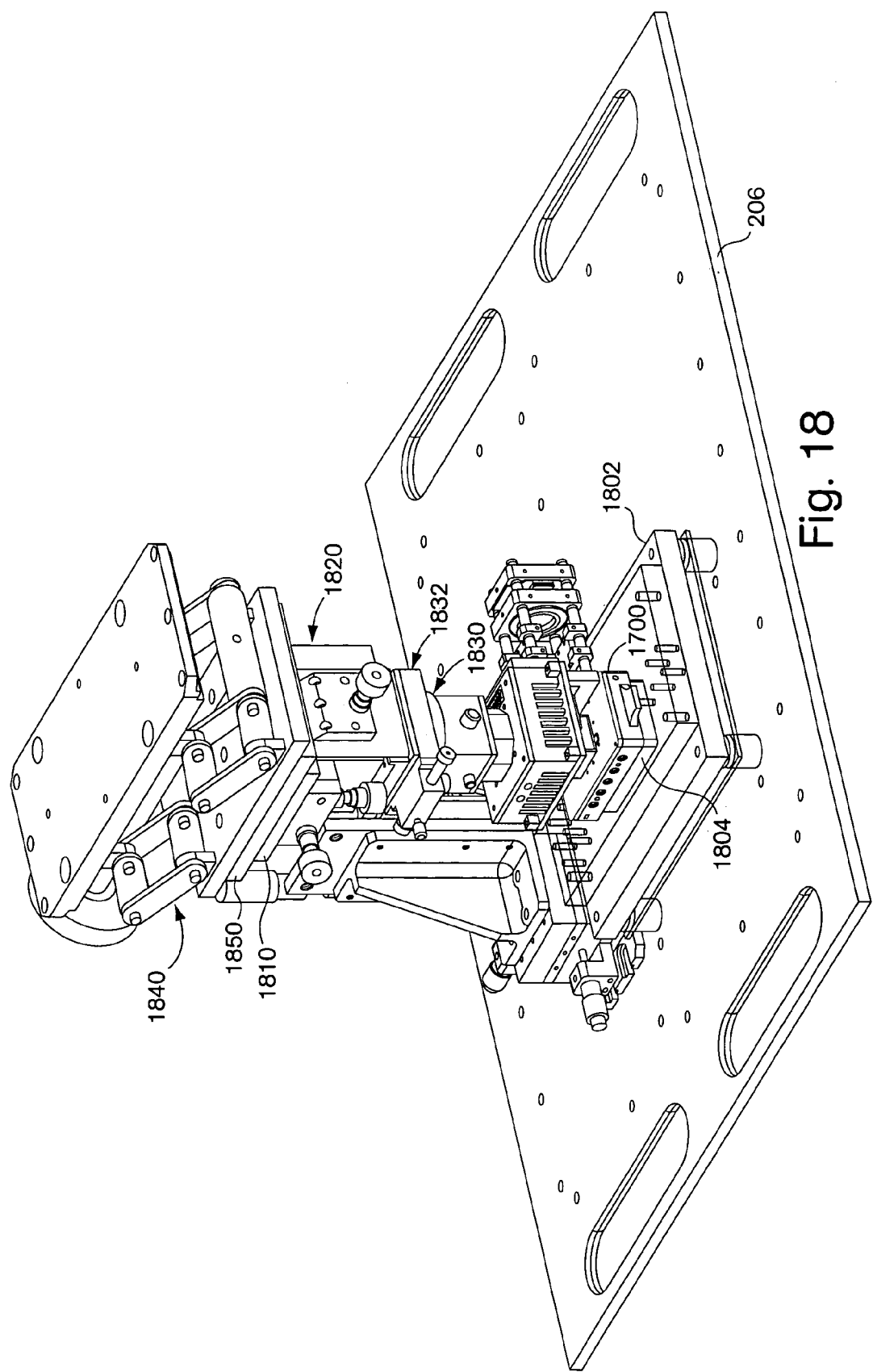
FIG. 18 is an illustration showing attachment of the illuminator to a fluidics heater assembly, a set of TEC assembly goniometer tilt stages, a TEC assembly rotary stage, TEC assembly flexure stage, adapter plate, lab jack, and instrument base plate.

FIG. 18 illustrates a fluidics heater assembly 1802, including a solid block 1804 of a thermally conductive material such as aluminum, placed directly under the fluid cell block 1700, and above a heating assembly 1802, so that a user of the microfluidics apparatus can conduct assays at a constant temperature of the user's selection.

TEC assembly goniometer tilt stages 1830 and 1832 are provided to the device reader as shown in FIG. 18. These are each of 40 mm size on an edge, and provide 15 degrees and 20 degrees axes of roll and pitch, respectively, to the stage. The goniometer tilt stages are commercially available (Edmund Industrial Optics, Barrington, N.J.). A TEC assembly rotary stage 1810 of 60 mm diameter, shown in FIG. 30, is also available (Edmund). A TEC assembly XYZ flexure stage 1820, can provide manual confirmation of the location of the spots on the target, and can be obtained from Thorlabs, Inc., Newton, N.J. In an alternative embodiment, the function of confirming of the locations of spots is a robotized process.

An adapter plate 1850 in FIG. 18 interfaces with a lab jack 1840 to provide variable height of the illuminator assembly from the microfluidics chip. The bottom plate 206 for the housing is also shown.

Devices similar to the illuminator herein, having the same or similar components with equivalent functions are additional embodiments of the invention and are described in the claims below. A number of different applications are envisioned. Possible applications include: object profile scanner, laser printer, free space optical communications, holographic data storage, fluorescein, tag stimulation, and surface plasmon resonance.

In one aspect, a system is provided for performing data retrieval and storage from the device reader PSD. The data are received in the form of a magnitude of electrical current, related to an angle of a beam of light incident on a position sensitive device (PSD).

The system comprises modules for data management, e.g., a data input means, a data storage means, a data retrieval means, and a data output means, as well as an instruction set and processing means. Processors appropriate for the system include any processors capable of recognizing an instruction set written in an appropriate language, for example but not limited to PowerPC based Apple® computers, Pentium® or similar PC type computers, SUN® or Silicon Graphics® workstations, or systems running LINUX or UNIX. The system is computer based, and may involve a standalone computer or one or more networked computers, for example packet-switched networks running relational database programs. In a currently preferred embodiment, the system is a plurality of computers in communication with a network, and analysis can be performed anywhere on the network.

The instruction set comprises a computer readable algorithm comprising the aforementioned electrical current, which is stored in computer readable media as part of a program written in a suitable language, for example C, C++, UNIX, FORTRAN, BASIC, PASCAL, or the like. The program provides the processor with instructions for performing calculations on the input data, as well as other functional elements contained in one or more modules or subroutines (e.g., relational database capabilities, search features, and other user defined functions). The algorithm includes input modules for entering data into the system in computer readable format; a selection module instructing the system to select and read data entered relating to one or more environmental or biological samples, for example from patients, or from plurality of data sources input by the user or by automated means; an analyzing module instructing the system to perform biostatistical analyses of the entered data further comprising the sample information and reference sample information, thereby detecting statistically significant similarities or differences between the sample information and a reference sample information; an association detection module instructing the system to correlate statistically significant similarities or differences between the sample information and the reference sample information with data relating to a particular condition. A program for detection of an association may be employed as a subroutine in the instruction set, which module detects an association between at least one cantilever array deflection and at least one condition detectable by analysis of a test sample, by measuring the extent of deflection of cantilevers in one interaction cell of a microfluidics device, and any differences between the magnitude of this deflection and deflections observed for the cantilevers in other interactions cells. This detection is performed by one or more user selectable programmable formula(s). In certain embodiments, association detection can be performed automatically without user intervention, and can be based on pre-determined routines; and a presenting module, instructing the system to present to the user the statistically significant similarities or differences among the samples and between the samples information and the reference sample.

In one aspect, the system includes an input module. Users of the system can enter data into the system in computer readable format, or can relay current information directly from the operating device reader into the system. Data entered into the system can be stored in RAM or ROM, or a more permanent storage medium such as a disk or tape drive. The information entered through the input module is thus accessible to a system processor. Examples of data entered into the system through an input module are data comprising test sample information and reference sample information, which include, but are not limited to sample history information, such as genetic information, information about a patient's family and medical histories of family members, polynucleotide sequence information for one or more gene loci or regulatory elements, genetic disease markers, and medical data from public databases, such as PUBMED, BLAST, SWISSPROT and similar public and private databases. Users can enter information through common data entry means such as a keyboard, GUI, mouse, voice commands, wireless devices and remote data links.

In one aspect, the system includes a selection module. The selection module instructs the system to select and read entered data. Information input by a user is retrieved from memory and communicated to the processor through a processor readable routine or program. These processor readable routines or programs can communicate with one or more user interfaces, preferably a graphical user interface. A user can enter data in one or more interfaces, such as information obtained from one or more samples, or information obtained from the environment, and the reference sample. The user-selected data communicated to the system by the selection module is stored by the system in memory for processing.

The system further includes an analyzing module. The analyzing module is an instruction set instructing the system to perform statistical analyses of the entered data Differences and similarities between the sample information and the reference sample information are calculated according to the statistical algorithms disclosed herein., i.e., association tests, chi square tests, and other statistically relevant informatic calculations, thereby detecting statistically significant similarities or differences between the sample information and the reference sample information.

The system further includes a presenting module. The presenting module instructs the system to present to the user any statistically significant similarities or differences between the sample information and the reference sample information, and the data relating to, for example, a particular condition for a biological or environmental sample. The output of the computer system can be represented in a word processing text file, formatted in commercially-available software such as WordPerfect® and Microsoft Word®, or represented in the form of an ASCII file, stored in a database application, such as DB2, Sybase, Oracle, or the like. A skilled artisan can readily adapt any number of data processor structuring formats (e.g. text file or database) in order to obtain computer readable medium having recorded thereon the expression information of the present invention. The system provides to the user information pertinent to any statistically relevant correlations or associations.

The various embodiments of the invention having now been fully described and illustrated by Figs., they are further shown in the claims below, which are exemplary in nature and are not to be considered as limiting. The contents of all references cited are hereby incorporated herein in their entirety.

EXAMPLE

The illuminator was installed into a test fixture having a microfluidics device with four interaction wells as the illumination target, each well having a microcantilever chip with an array of five microcantilevers, the components having the same configuration as for the complete device reader.

The microlens array was installed as in the embodiment shown in in FIG. 10 herein using a removable positioning stage (micropositioner) rather than the epoxy-held spacers described as a different embodiment.

Figure 19:
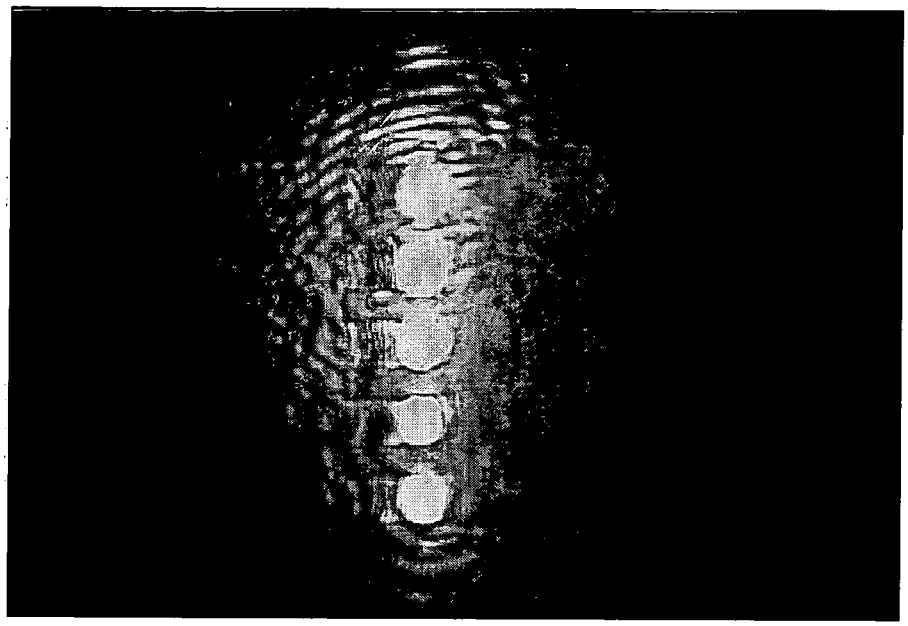
FIG. 19 is a photograph of five beams of light directed from the illuminator using the micropositioner as shown in FIG. 13 onto five microcantilevers located in an interaction cell of a microcantilever chip.

FIG. 19 shows spots of light beams from the illuminator of FIG. 10 focused onto each of the five microcantilevers in the well of a microcantilever chip embedded in a microfluidics card by the micropositioner as shown in FIG. 10. The microcantilevers have a free end which as shown in FIG. 19 is on the right (see also FIG. 20), and a fixed end to the microcantilever array with a base to the left.

Bright focused spots can be seen in the photograph of FIG. 19, each spot illuminating one of the five microcantilevers. The spots are circular in shape, and of a diameter that is equal to or less than the width of each microcantilever. These results indicate that this illuminator can be used to measure the deflection of each microcantilever, which can be monitored individually without interference from another beam, by analysis of the angle of reflection of the spot using a PSD as described herein.

Figure 20:
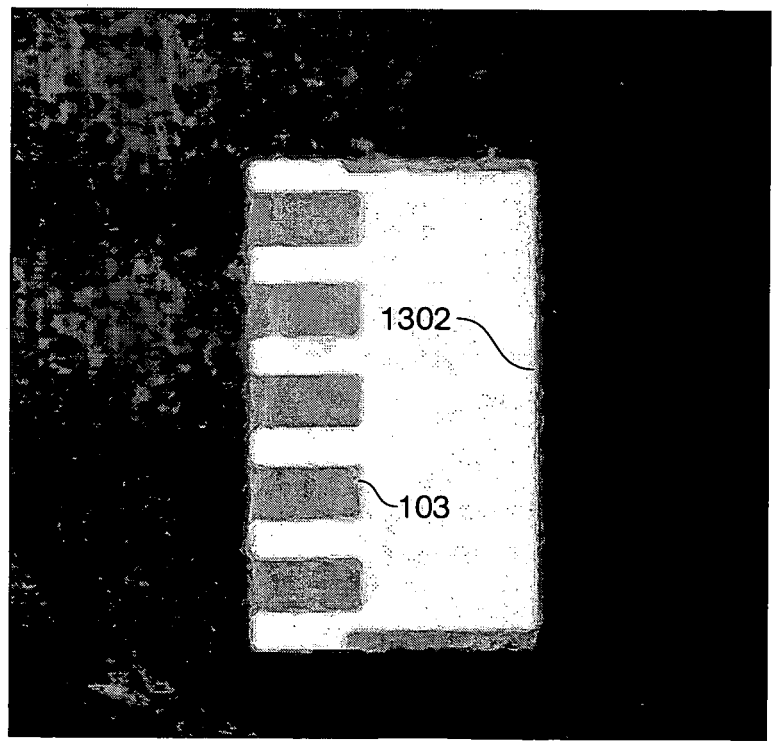
FIG. 20 is a photograph of the five microcantilevers as shown in FIG. 19, however in the absence of the beams of light.

FIG. 20 shows the same microcantilever chip 1302 as shown in FIG. 19, however in the absence of light beams. These data indicate that the illuminator herein is operative for detection of microcantilever deflection.

What is claimed is:

1. A method for reading an array of detectors contained in a device, the method comprising: illuminating each of the detectors of the array using a plurality of electromagnetic beams arranged in an array, wherein the device with the array of detectors is a microfluidics device, such that at least one electromagnetic beam illuminates at least one of the detectors of the array and wherein illuminating includes generating electromagnetic beams, transmitting the electromagnetic beams from an array of vertical cavity surface emitting lasers (VCSELs) mounted on a substrate, wherein a beam splitter is located between the VCSELs and the detectors whereby a portion of the beams is directed to a surface of the detectors; and sensing the plurality of electromagnetic beams reflected from the detectors.

2. The method according to claim 1, wherein the detectors are microcantilevers within the device.

3. The method according to claim 1, wherein sensing includes using a plurality of position sensing detectors (PSDs).

4. The method according to claim 1, further comprising placing the microfluidics device at a distance from the array of VCSELs.

5. The method according to claim 1, wherein illuminating is providing a wavelength of about 760 nm±20 nm.

6. The method according to claim 1, further comprising placing a test liquid in the device.

7. The method according to claim 6, wherein the test liquid contains a biological molecule.

8. The method according to claim 7, wherein sensing the beam is detecting binding of the biological molecule to a micro-force enabling composition on a surface of the microcantilever.

9. An apparatus for reading an array of detectors contained in a microfluidics device, the apparatus comprising: a housing having an opening to receive the microfluidics device; an array of illuminators positioned in the housing such that each illuminator is configured to illuminate at least one of the detectors in the array of detectors, the illuminators comprising an array of vertical cavity surface emitting lasers (VCSELs); a beam splitter located between the VCSELs and the detectors, wherein the beam splitter directs a portion of beams to a surface of the detectors; and a position-sensing device contained in the housing and positioned to receive at least one electromagnetic beam reflected from the detectors.

10. The apparatus according to claim 9, wherein the detectors are microcantilevers.

11. The apparatus according to claim 10, wherein each VCSEL further comprises an electrical connection.

12. The apparatus according to claim 11, wherein the electrical connection comprises a gold stud bump.

13. The apparatus according to claim 11, wherein the electrical connection comprises a wire bond.

14. The apparatus according to claim 9, wherein the microfluidics device is located at a distance from the VCSELs wherein the distance is about 30 mm to about 60 mm.

15. The apparatus according to claim 14, wherein the PSD comprises at least one photosensitive cell wherein the intensity and location of the beam reflected from the microcantilever indicates an extent of deflection of the microcantilever.

16. The apparatus according to claim 9, wherein a surface of the detectors contain a micro-force enabling composition capable of binding to a biological molecule in a sample.

17. The apparatus according to claim 9, further comprising an array of microlenses located between the VCSELs and the detectors.

18. The apparatus according to claim 9, wherein the array of illuminators comprises at least about 30 illuminators.

19. The apparatus according to claim 9, wherein the array of illuminators comprises at least about 60 illuminators.

20. An illuminator apparatus which is a micro-optical subassembly for illuminating a plurality of microcantilevers, the apparatus comprising: a-means for generating and transmitting a plurality of electro-magnetic beams in a linear array; an electrical power source further having electronics, control, wiring harness and interface connector; a microlens array for focusing the beams to provide a spot of illumination on each microcantilever target, wherein the microcantilever is emplaced so that the beams are reflected from the target; a beam splitter that directs a portion of each of the plurality of the beams to a surface of each microcantilever target; and a housing for the apparatus.

21. The illuminator of claim 20, wherein the microcantilevers are located within a microfluidics device removably positioned within the housing.

22. The illuminator of claim 20, wherein the microcantilevers are configured to contain a microforce-sensing material.

23. The illuminator of claim 22, wherein the microforce is selected from the group consisting of a chemical microforce, a magnetic microforce, a thermal microforce, a piezoelectric microforce, and a piezoresistive microforce.

24. An illuminator for generating an array of electromagnetic beams for reading a plurality of detectors, the illuminator comprising a plurality of vertical cavity surface emitting lasers (VCSELs), a circuit with electronics and control, a beam splitter located between the VCSELs and the detectors, wherein the beam splitter directs a portion of the beams to a surface of the detectors, and a housing, wherein the illuminator comprises the plurality of VCSELs connected in the circuit within the housing, and the VCSELs generate the array of electromagnetic beams, and wherein the detectors are an array of microcantilevers within a microfluidics device emplaced within the housing.

25. The illuminator according to claim 24, wherein the VCSELs in the plurality is about the same in number as the microcantilevers in the array.

26. The illuminator according to claim 24, wherein the illuminators generate an electromagnetic beam having a wavelength selected from the group of about 670 nm±20 nm, about 760 nm±20 nm, about 850 nm±20 nm, about 1200 nm±20 nm, about 1350 nm±20 nm, and about 1550 nm±20 nm.

27. The illuminator according to claim 24, wherein the illuminators generate an electromagnetic beam having a wavelength of about 760 nm±20 nm.

28. The illuminator according to claim 24, further comprising an array of microlenses located between the VCSELs and the detectors.

29. The illuminator according to claim 28, further comprising a micropositioner base.

30. The illuminator according to claim 29, wherein the micropositioner base is mounted on the substrate.

31. The illuminator according to claim 30, further comprising a microlens holder with microlens array.

32. The illuminator according to claim 24, wherein the VCSELs are mounted on a thermally and electrically conducting substrate.

33. The illuminator according to claim 32, further comprising a microflex circuit on the substrate.

34. The illuminator according to claim 33, wherein the microflex circuit is attached to the substrate with an adhesive.

35. The illuminator according to claim 33, wherein the microflex circuit comprises a layer of each of copper, nickel, and gold.

36. The illuminator according to claim 32, wherein a VCSEL array die is mounted on the electrically conducting substrate with a gold alloy or a silver-loaded epoxy.

37. The illuminator according to claim 36, wherein a common VCSEL cathode is in contact with the alloy or the epoxy.

38. The illuminator according to claim 36, wherein the VSCEL array die has output apertures having a diameter from at least about 1.5 μm to about 20 μm.

39. The illuminator according to claim 24, wherein the distance from the plurality of VCSELs to the array of microcantilevers is about 30 mm.

40. The illuminator according to claim 24, further comprising a windowed lid.

41. The illuminator according to claim 40, further comprising a micropositioner screw block mounted on the substrate.

42. The illuminator according to claim 24, wherein the plurality of VCSELs comprises at least about 20 VCSELs.

43. The illuminator according to claim 24, wherein the plurality of VCSELs comprises at least about 60 VCSELs.

* * * * *